(12) United States Patent
Jordanov

(10) Patent No.: US 7,269,523 B2
(45) Date of Patent: Sep. 11, 2007

(54) METHOD AND APPARATUS FOR RADIATION SPECTROSCOPY USING SEEDED LOCALIZED AVERAGING ("SLA")

(76) Inventor: Valentin T. Jordanov, 12 Cutts Rd., Durham, NH (US) 03824

( * ) Notice: Subject to any disclaimer, the term of this patent is extended or adjusted under 35 U.S.C. 154(b) by 0 days.

(21) Appl. No.: 10/967,770

(22) Filed: Oct. 19, 2004

(65) Prior Publication Data
US 2006/0085168 A1    Apr. 20, 2006

(51) Int. Cl.
G01R 13/00 (2006.01)
G01R 23/16 (2006.01)

(52) U.S. Cl. ............... 702/66; 702/76; 702/199
(58) Field of Classification Search ......... 702/199, 702/66, 76
See application file for complete search history.

(56) References Cited

U.S. PATENT DOCUMENTS

| | | | |
|---|---|---|---|
| 3,872,287 A | 3/1975 | Henriecus | |
| 4,476,384 A | 10/1984 | Westphal | |
| 4,870,669 A * | 9/1989 | Anghaie et al. | 378/87 |
| 4,937,452 A | 6/1990 | Simpson et al. | |
| 5,021,664 A | 6/1991 | Hinshaw | |
| 5,873,054 A | 2/1999 | Warburton et al. | |
| 6,327,549 B1 | 12/2001 | Bingham et al. | |
| 6,584,413 B1 * | 6/2003 | Keenan et al. | 702/28 |
| 6,590,957 B1 | 7/2003 | Warburton et al. | |

OTHER PUBLICATIONS

G.F. Knoll, "Radiation Detection and Measurement" Wiley, New York, Third Edition, Chapter 18,pp. 691 and 692.*
P.W. Nicholson, "Nuclear Electronics" Wiley Interscience, New York, Chapter 8, pp. 304 and 305.*
Wiley, P.W. Nicholson *Nuclear Electronics* 1974.
Wiley G.F. Knoll *Radiation Detection and Measurement* Third Edition 2000.

* cited by examiner

*Primary Examiner*—John Barlow
*Assistant Examiner*—Cindy D. Khuu
(74) *Attorney, Agent, or Firm*—Robert G. Crooks

(57) ABSTRACT

A method, and apparatus for carrying it out, for processing pulses derived from a radiation detector, those pulses having already been resolved by a pulse-height analyzer into channels having respective addresses indicative of their respective heights. The method includes steps of receiving a plurality of channel-address values from the pulse-height analyzer, averaging over a window selected ones of the channel-address values to obtain an average channel address for the selected channel-address values, and using the average channel address to increment the content of a spectrum channel. Speed and accuracy of execution of the method may be optimized if a criterion for selecting channel-address values for averaging is made variable so as to permit recycling of the channel addresses and so as to avoid counting losses.

8 Claims, 24 Drawing Sheets

| PULSE HEIGHT | SPECTRUM MEMORY | | | |
|---|---|---|---|---|
| | CHANNEL ADDRESS | CHANNEL CONTENT (before) | | CHANNEL CONTENT (after) |
| | N | 9999 | | 9999 |
| | ⋮ | ⋮ | | ⋮ |
| | 1008 | 254 | | 254 |
| | 1007 | 234 | | 234 |
| | 1006 | 267 | | 267 |
| | 1005 | 432 | | 432 |
| | 1004 | 512 | | 512 |
| | 1003 | 698 | | 698 |
| | 1002 | 864 | | 864 |
| | 1001 | 1009 | | 1009 |
| | 1000 | 1620 | | 1620 |
| | 999 | 2002 | | 2002 |
| | 998 | 3427 | ADD ONE | 3427 |
| | 997 | 4912 | | 4912 |
| | 996 | 5432 | +1 | 5433 |
| | 995 | 4786 | | 4786 |
| | 994 | 3256 | | 3256 |
| | 993 | 1543 | | 1543 |
| | 992 | 980 | | 980 |
| | 991 | 736 | | 736 |
| | 990 | 689 | | 689 |
| | 989 | 745 | | 745 |
| | ⋮ | ⋮ | | ⋮ |
| PULSE | 0 | 100 | | 100 |

FIG. 4
(PRIOR ART)

Spectra from Am-241 radioactive source obtained with scintillation detector.

Spectra from Co-60 radioactive source obtained with scintillation detector.

METHOD AND APPARATUS FOR RADIATION SPECTROSCOPY USING SEEDED LOCALIZED AVERAGING ("SLA")

The invention covered by this patent application has no related application.

This invention was not made with any federally-sponsored research and/or development aid.

This application does not include a "Sequence Listing" or any other appended material on disc.

BACKGROUND OF THE INVENTION

The principal objective of radiation spectroscopy is to record a spectrum from a radiation detector. The spectrum provides information about the incident radiation and the response of the radiation detector. A common approach to the securing and recording of differential pulse-height spectra is to use a multi-channel pulse-height analyzer, sometimes referred to as a "multi-channel analyzer ("MCA"), as fully described in the referenced textbook *Radiation Detection and Measurement*, Wiley, Third edition, 2000, by Glenn F. Knoll. The differential pulse-height spectrum is recorded as a differential number of pulses with pulse heights within a small amplitude interval. This interval is nearly constant over the full range of analyzed pulse heights and is called "channel width." The full pulse-height range divided by the channel width determines the total number of channels of the pulse-height analyzer. Typically, the channels are consecutively numbered, using integer numbers starting from zero.

FIG. 1 depicts a typical radiation-spectroscopy system based on a multi-channel pulse-height analyzer. The radiation strikes a RADIATION DETECTOR (10) and deposits partial or full energy into the detector. (In referring to prior-art components and sub-assemblies, upper-case letters, and reference numerals in parentheses, are being employed to set the stage for the description of the present invention in later paragraphs.) The interaction between the radiation and the RADIATION DETECTOR is often referred to as a "detector event."

The RADIATION DETECTOR responds to the deposited energy by one or more different mechanisms, such as generating electrical charge or a short current pulse, emitting short pulses of light, changing RADIATION DETECTOR temperature, or creating acoustic waves. In all cases for the purpose of pulse-height spectroscopy, use is made of short electrical pulses derived from the RADIATION DETECTOR signal.

The electrical pulses are processed by a SIGNAL PROCESSOR (20.) The SIGNAL PROCESSOR provides means to fully collect the signal from the detector, reduce the noise, suppress "pulse pile-up" and to accommodate other functions that enhance the quality of the recorded spectra. A processor may work in both analog and/or digital domains. In both cases, the pulse height is proportional to the magnitude of the signal from the detector.

A PULSE-HEIGHT ANALYZER (30) measures the pulse heights of the pulses from SIGNAL PROCESSOR (20). The main functions of PULSE-HEIGHT ANALYZER (30) are peak detection and analog-to-digital conversion of the pulse height. If a pulse height is within a given channel width, then the corresponding CHANNEL ADDRESS is generated at the output of PULSE-HEIGHT ANALYZER (30). The CHANNEL ADDRESS is an integer number obtained as a result of a single pulse-height measurement performed by PULSE-HEIGHT ANALYZER (30) and can be viewed as a digitized pulse height.

The CHANNEL ADDRESS is fed to a SPECTRUM MEMORY UNIT (40). SPECTRUM MEMORY UNIT (40) builds the spectrum histogram by incrementing the "channel content" of the channels indicated by the CHANNEL ADDRESSES from PULSE-HEIGHT ANALYZER (30). In some cases, SPECTRUM MEMORY UNIT (40) scales down the CHANNEL ADDRESS so that the spectrum resolution is less than the resolution of the PULSE-HEIGHT ANALYZER (30).

FIG. 2 shows a block diagram of SPECTRUM MEMORY UNIT (40). The CHANNEL ADDRESS is fed at the input (41). CONTROL UNIT (43) responds to each CHANNEL ADDRESS by incrementing the corresponding channel in a SPECTRUM MEMORY (45). The SPECTRUM-MEMORY channel organization is represented by memory locations that increment every time they are addressed by the corresponding CHANNEL ADDRESS. Typically, the CHANNEL ADDRESS is an address of a physical location in the memory.

An ARITHMETIC UNIT (47) is used to increment the contents of the channels. In most cases, the channel content increments by one. In some circumstances, the increment amount may be different from one. U.S. Pat. No. 6,327,549—Bingham et al. discloses a system that has two banks of histogram memory. Both banks are addressed by the same CHANNEL ADDRESS, but the respective increment amounts for each of them are different. The recorded spectra in SPECTRUM MEMORY (45) are read through the output (49) by user interface for visualization, and can be processed by application software for analysis and storage.

The conventional SPECTRUM MEMORY UNIT operates using a technique that is well known and has been published in various textbooks and technical papers [Knoll, Nicholson and others as cited]. FIG. 3 shows the flowchart of the conventional method of operation of a SPECTRUM MEMORY UNIT using a conventional spectrum-building method. The flowchart has the following variables:

j=CHANNEL ADDRESS of the SPECTRUM MEMORY;

ch[j]=content of the j channel of the SPECTRUM MEMORY; and inc=channel increment value, typically equal to one.

Once the operation starts (termination 100), the conventional spectrum-building method checks (decision 110) for the presence of a new CHANNEL ADDRESS from the PULSE-HEIGHT ANALYZER. If there is no new, available CHANNEL ADDRESS, the algorithm checks whether data acquisition is enabled (decision 140). If data acquisition is not enabled, "stop state" is entered (termination 150). If data acquisition is enabled, the algorithm returns to check for a new CHANNEL ADDRESS (decision 110). When available, the new CHANNEL ADDRESS j is received by the SPECTRUM MEMORY UNIT (step 120). Once the CHANNEL ADDRESS j is known, a spectrum-memory operation (step 130) ch[j]=ch[j]+inc is performed to increment the channel content corresponding to CHANNEL ADDRESS j. This concludes the processing of a given CHANNEL ADDRESS. If more pulse heights are to be acquired (decision 140), the entire sequence repeats by returning to the point where the presence of a new CHANNEL ADDRESS is checked for (decision 110). Upon data-acquisition termination, the stop state (termination 150) is entered.

The following is a summary of the main steps of the conventional spectrum-building method:

a) Monitor for a new CHANNEL ADDRESS as long as the spectrum acquisition is enabled;
b) If a new CHANNEL ADDRESS is available, receive the CHANNEL ADDRESS;
c) Increment the "channel content" based on the CHANNEL ADDRESS; and
d) Repeat the sequence as long as spectrum acquisition is required.

The salient feature of this widely-used method is the fact that the increment of the spectroscopy channels is based on a single pulse-height measurement. That is, every time a CHANNEL ADDRESS is received, the corresponding channel content increments.

FIG. 4 illustrates the operation of the conventional SPECTRUM MEMORY UNIT. In this particular example, a PULSE is processed by the PULSE-HEIGHT ANALYZER. The result of the pulse-height measurements is a CHANNEL ADDRESS equal to 996. The SPECTRUM MEMORY UNIT increments the channel content of channel 996. Before the pulse-height measurement, the content of channel 996 is 5432. After adding the increment amount (one in this case) the content of channel 996 becomes 5433. This amount is stored in the SPECTRUM MEMORY. This amount will remain in the memory until another pulse-height measurement generates a CHANNEL ADDRESS equal to 996 or until the SPECTRUM MEMORY is erased by the user.

An example of a radiation spectrum is shown in FIG. 5. The horizontal axis is the CHANNEL ADDRESS. The vertical axis represents the channel content, i.e. the number of counts. The most important characteristic of the spectroscopy system is its resolution (energy, time etc.) The "full width at half maximum (FWHM)" of the spectral peaks is defined as the width of the peak at half (0.5H) of its maximum (H). FWHM is a measure of the spectroscopy system's capability to resolve incident-radiation spectral characteristics such as energy. The FWHM depends upon various factors: statistical fluctuations of the detector signal, noise contribution of the signal processor, external interference, temperature, and long-term drifts etc. [Knoll].

BRIEF SUMMARY OF THE INVENTION

The statistical fluctuations determine the theoretical limit of the energy resolution for a given detector. The resolution-limiting effects of noise sources can be reduced by using appropriate noise-filtering and other electronic techniques. In accordance with this invention, the resolution-limiting effects of detector statistical fluctuations are sharply reduced by averaging CHANNEL-ADDRESS values and using the obtained average value as an AVERAGE CHANNEL ADDRESS to address the SPECTRUM-MEMORY channels. The foregoing procedure is a principal feature of this invention.

BRIEF DESCRIPTION OF THE DRAWINGS

The invention summarized above will be described in detail in the following specification, which will be best understood if it is read while referring to the accompanying drawings, in which:

FIG. 4 illustrates the operation of a conventional SPECTRUM MEMORY UNIT in processing a pulse from a PULSE-HEIGHT ANALYZER ("block 30" of FIG. 1);

FIG. 8B follows the convention of using only upper-case lettering in the text material of the flow chart. But the use of upper-case lettering exclusively has necessitated "running the words together." Accordingly, the same substantive subject matter is being shown in "FIG. 8C," using both upper-case and lower-case lettering in such a way that there is some space between words;

DETAILED DESCRIPTION OF THE PREFERRED MODE OF CARRYING OUT THIS INVENTION

This invention is based on a new technique called Seeded Localized Averaging ("SLA"). SLA technique allows to build average sum of CHANNEL ADDRESS values in order to improve the resolution of the radiation detectors. The CHANNEL ADDRESS values are consecutive integer numbers which correspond to "channel numbers" in previous literature. The number of CHANNEL ADDRESS values that are used in the average sum is the "average number". This number depends on the detector properties and on the desired degree of resolution improvement. In most cases this number will be experimentally obtained. The SLA method produces an AVERAGE CHANNEL ADDRESS that is result of the division of the average sum by the average number. The AVERAGE CHANNEL ADDRESS is used to build the radiation spectrum.

A principal feature of this new method and the fundamental difference from the conventional spectrum-building method is the use of more than one CHANNEL ADDRESS value to increment a single spectrum channel. That is, two or more pulse-height measurements are used to obtain the AVERAGE CHANNEL ADDRESS and to increment the corresponding channel in the SPECTRUM MEMORY.

Figure 1:
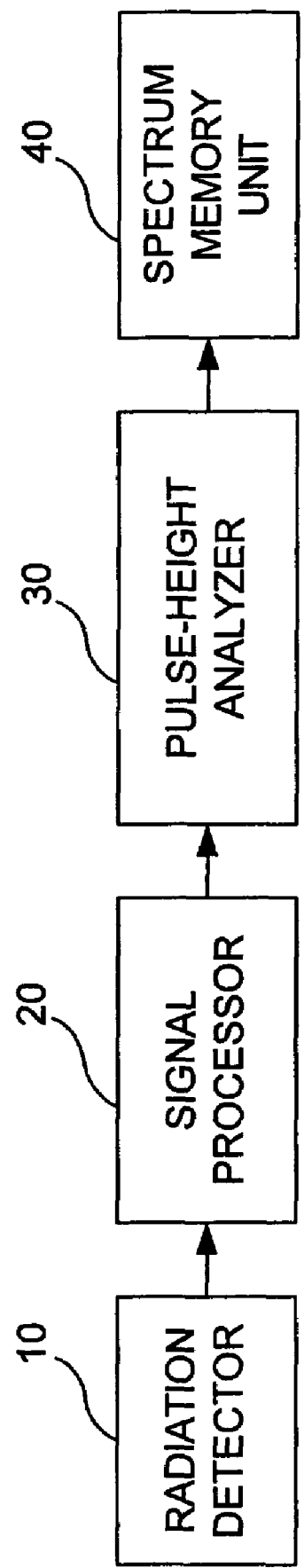
FIG. 1 is a block diagram of the basic elements of a radiation-spectroscopy system based on a multi-channel pulse-height analyzer in accordance with the prior art.
Figure 2:
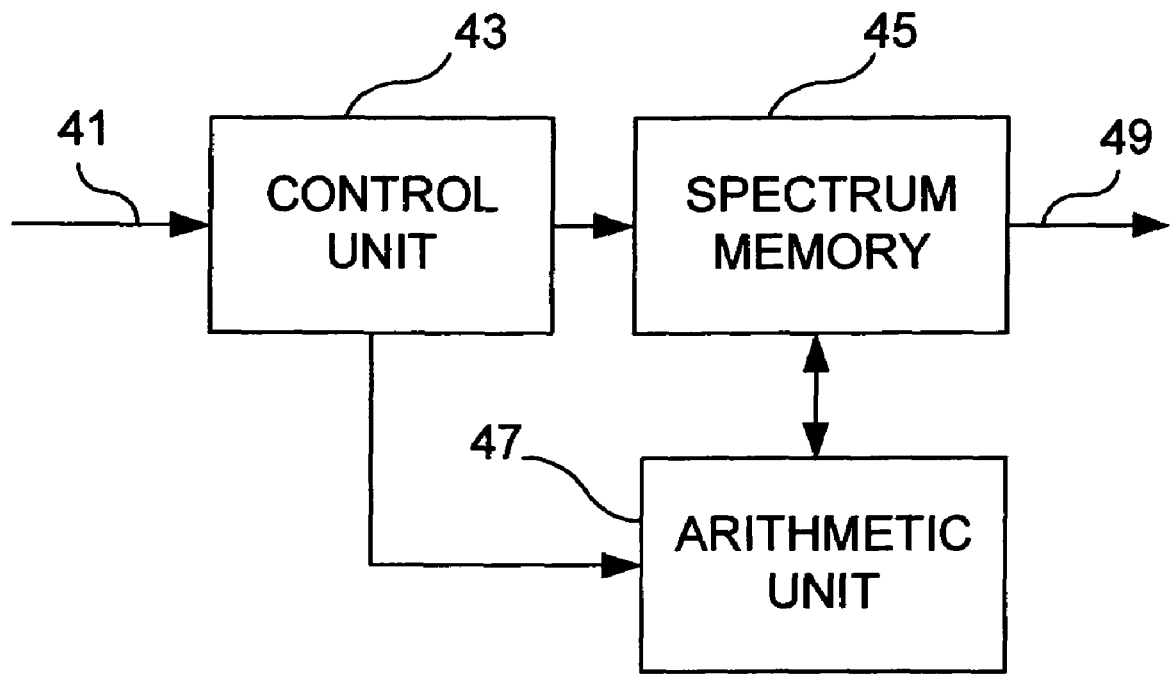
FIG. 2 is a block diagram of a SPECTRUM MEMORY UNIT ("block 40" of FIG. 1,) in accordance with the prior art.
Figure 3:
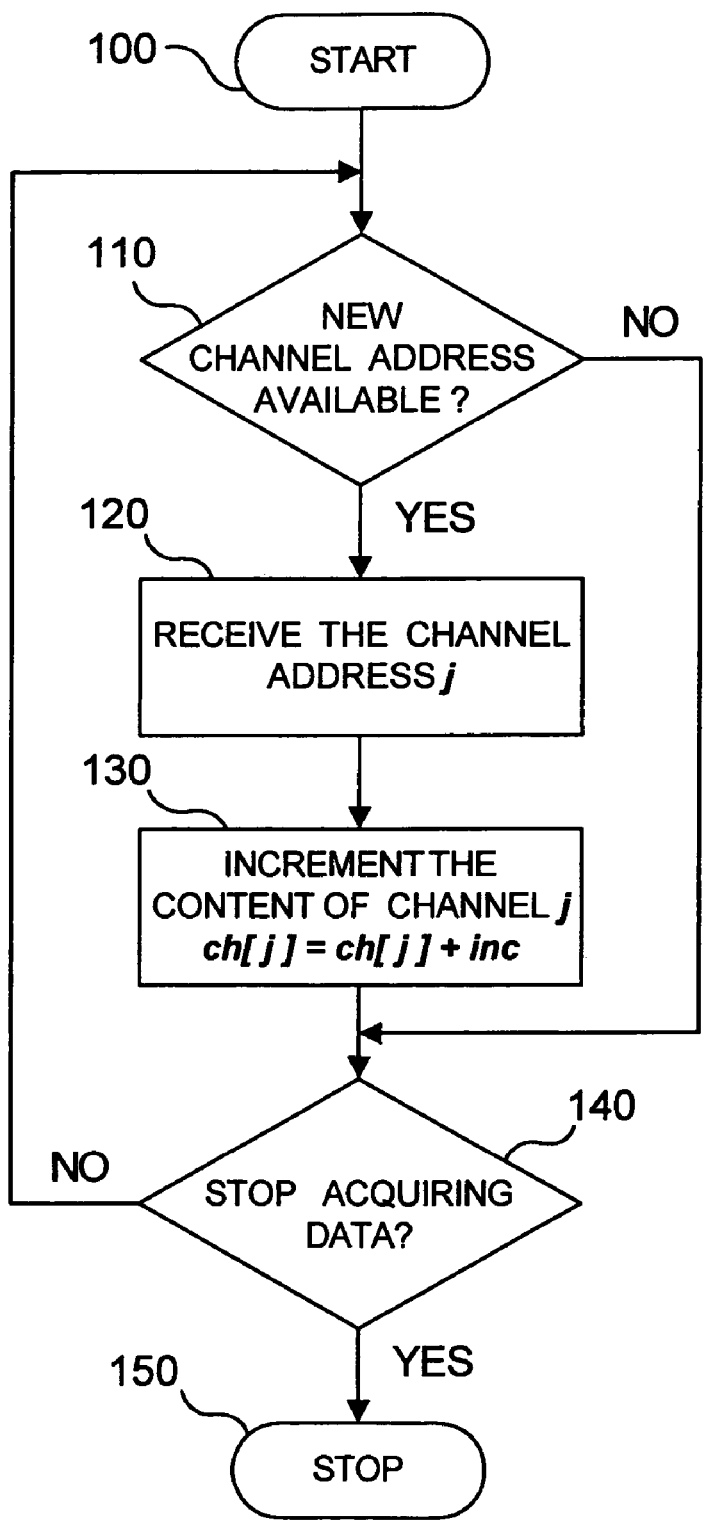
FIG. 3 is a flowchart of the conventional method of operation of the SPECTRUM MEMORY UNIT of FIG. 2.
Figure 5:
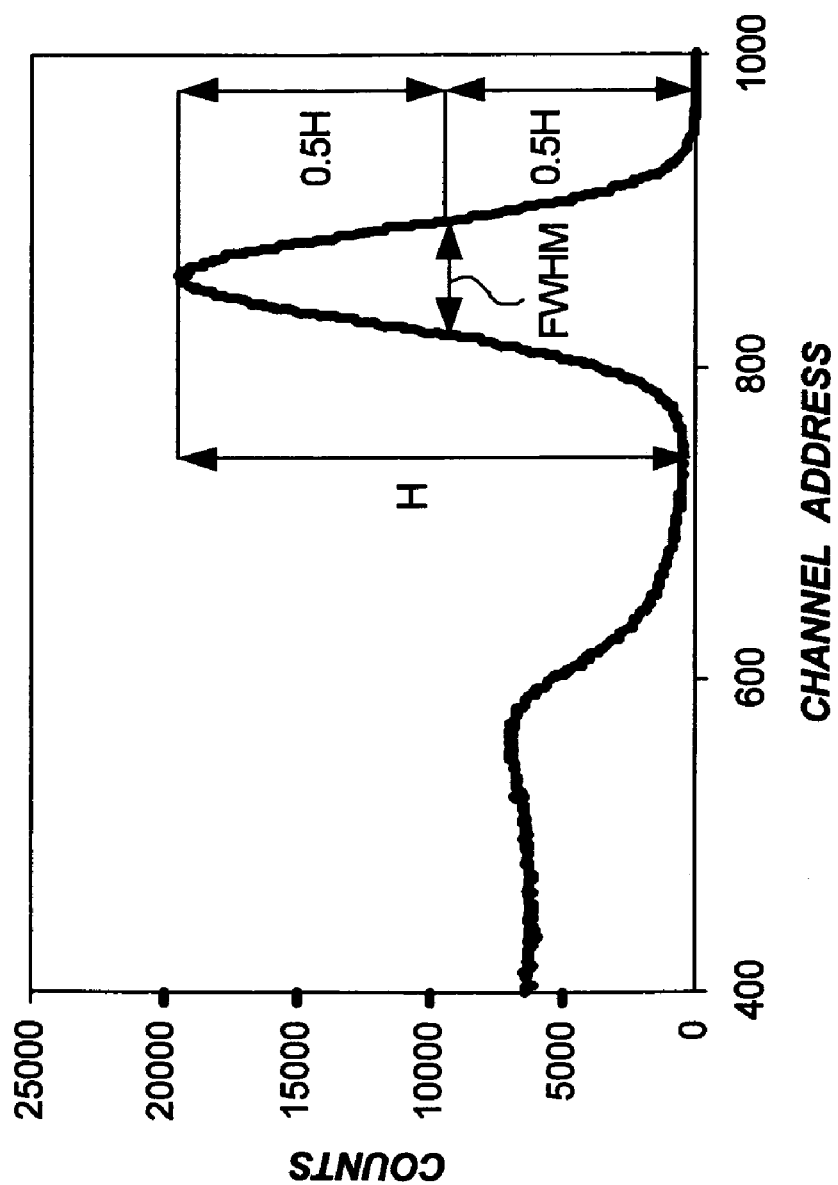
FIG. 5 is an example of a radiation spectrum in which "COUNTS" are plotted as function of "CHANNEL ADDRESS," and showing the relatively broad peak which is produced by spectroscopy systems of the prior art.
Figure 6:
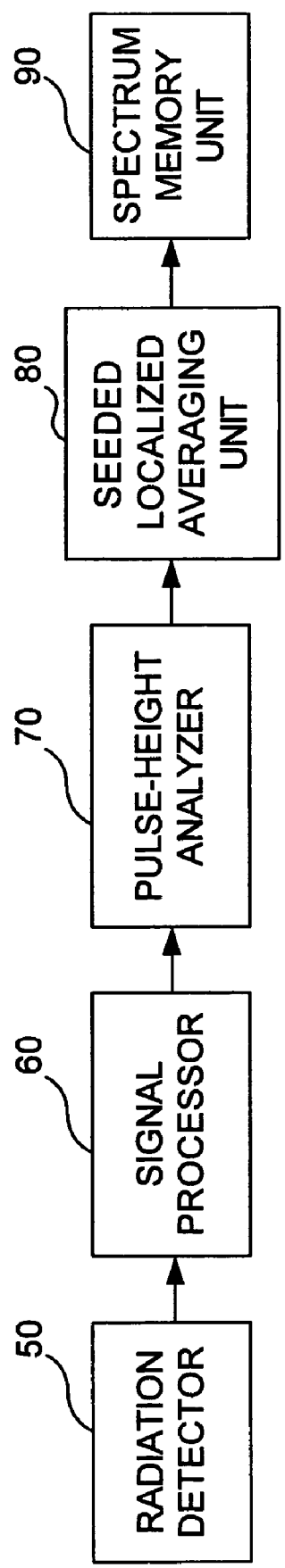
FIG. 6 is a block diagram of a spectroscopy system in accordance with the present invention, in which a "SEEDED LOCALIZED AVERAGING UNIT" ("block 80") is added to the system to "SEED A NEW AVERAGE SUM" in accordance with the invention.

The block diagram of a spectroscopy system using the SLA method is shown in FIG. 6. The RADIATION DETECTOR (50), the SIGNAL PROCESSOR (60), the PULSE HEIGHT ANALYZER (70), and the SPECTRUM MEMORY UNIT (90) are comparable and perform similar functions to these in a conventional spectroscopy system. The SEEDED LOCALIZED AVERAGING UNIT (80) is a new block that performs the SLA functions.

Figure 7A:
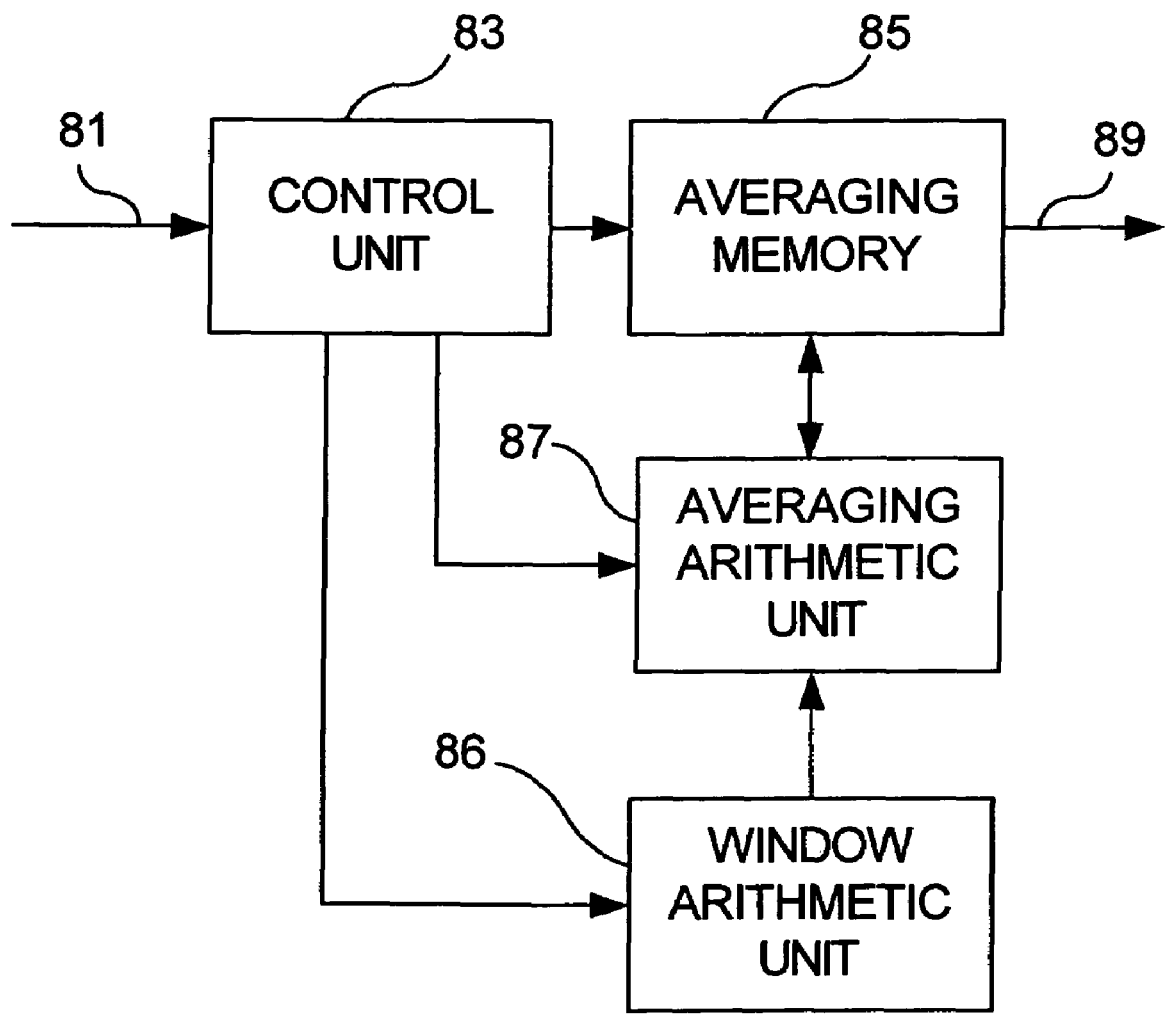
FIG. 7A is a block diagram of one possible arrangement of the "SEEDED LOCALIZED AVERAGING UNIT" including a "WINDOW ARITHMETIC UNIT" ("block 86") which generates an "averaging window"

FIG. 7A shows a block diagram of one possible arrangement of the SEEDED LOCALIZED AVERAGING UNIT (80). The CHANNEL ADDRESS values are received at the input (81). The CONTROL UNIT (83) synchronizes the operation of the other units. The AVERAGING MEMORY (85) is organized in channels similarly to the SPECTRUM MEMORY. The total number of channels is equal to the number of all possible CHANNEL ADDRESS values from the PULSE-HEIGHT ANALYZER. This number can be equal to or greater than the total number of SPECTRUM MEMORY channels. Thus, the AVERAGING MEMORY channels may have equal or narrower width compared to the SPECTRUM MEMORY channels.

Each channel of the AVERAGING MEMORY holds two values (content): average sum and average number. The storage of the two values does not mean that both values require separate physical storage locations. There is always one physical location per channel to store one of the two values. The other value of the same channel can be stored either physically or "logically". In the first case a separate physical memory location is associated with the same channel. The "logical" storage means that the value is contained within and could be derived from the other value and the address (CHANNEL ADDRESS) of the physical memory location where it is stored.

For example, if the average number is a function of the CHANNEL ADDRESS and the average sum, then the average number can be retrieved from the physically stored average sum at the location pointed by the CHANNEL ADDRESS. This invention can utilize either physical or "logical" memory storage. Therefore, any further reference to memory storage implies either physical or "logical" memory storage.

The averaging function is performed by AVERAGING ARITHMETIC UNIT (87). This unit can be implemented as a dedicated arithmetic hardware or as a computational device (microprocessors, Digital Signal Processors (DSP)) executing the SLA algorithm in software. The averaging is performed in a narrow interval of channels. This interval of channels is the averaging window. The averaging window is generated by the WINDOW ARITHMETIC UNIT (86). The averaging window, in general, will depend on the CHANNEL ADDRESS. WINDOW ARITHMETIC UNIT (86) calculates the averaging window using a formula that defines the window size in channels as a function of the CHANNEL ADDRESS. The calculation can be carried out by dedicated hardware algorithm implemented, for example, in Field Programmable Gate Arrays (FPGA). It is also possible to compute the formula by software using fast DSP or fast microprocessor.

The averaging window, in general, will depend on the CHANNEL ADDRESS. In rare cases, however, this dependence may result in a constant value for all averaging window values over the entire range of CHANNEL ADDRESSES. In this case, the WINDOW ARITHMETIC UNIT (86) supplies a constant value to the AVERAGING ARITHMETIC UNIT (87). The AVERAGE CHANNEL ADDRESS is generated at the output (89).

The averaging window dependence on the CHANNEL ADDRESS can be determined from a spectrum obtained with a conventional spectroscopy system. In this case as a practical implementation, a look-up table with pre-calculated averaging windows can be used.

Figure 7B:
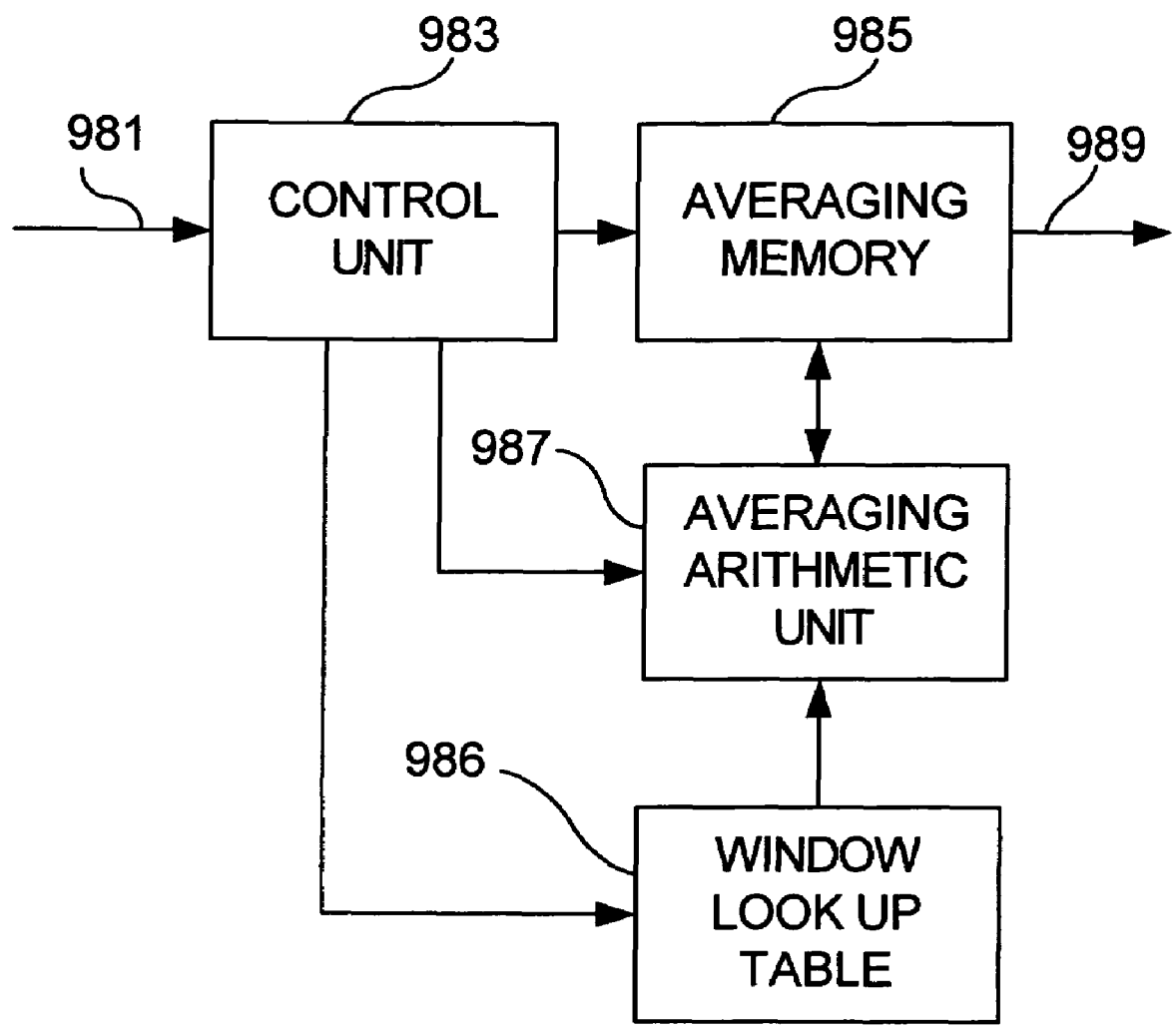
FIG. 7B is a block diagram of an alternative configuration of the SEEDED LOCALIZED AVERAGING UNIT in which a "WINDOW LOOKUP TABLE" ("block 986") has been substituted for the WINDOW ARITHMETIC UNIT to supply the "averaging window"

FIG. 7B depicts a configuration of the SEEDED LOCALIZED AVERAGING UNIT (80) based on a look-up table. The CHANNEL ADDRESS values are received at the input (981). The CONTROL UNIT (983), the AVERAGING MEMORY (985), and the AVERAGING ARITHMETIC UNIT (987) are identical and perform the same respective functions as the CONTROL UNIT (83), the AVERAGING MEMORY (85), and the AVERAGING ARITHMETIC UNIT (87) in FIG. 7A. The WINDOW LOOK-UP TABLE (986) has the same number of entries as the number of all possible CHANNEL ADDRESS values. The WINDOW LOOK-UP TABLE (986) is arranged in such a way that each entry of the table corresponds to one and only one CHANNEL ADDRESS. When a CHANNEL ADDRESS is received, it is used to address the WINDOW LOOK-UP TABLE (986) entries. The value at the addressed location represents the averaging window and is passed to the AVERAGING ARITHMETIC UNIT (987). The AVERAGE CHANNEL ADDRESS is generated at the output (989). A common way to implement the look-up table is to use solid-state memory. A fast retrieval of the look-up table values can be achieved using embedded memory blocks of high-density FPGA.

The AVERAGING MEMORY UNIT utilizes the SLA method. Using simple pulse-height-measurement averaging over the full range of all pulse heights will destroy the differential pulse-height information and will be quite useless. Therefore, a selective approach to carry out the averaging needs to be implemented. The SLA method solves this problem by performing averaging only over a narrow averaging window around a given CHANNEL ADDRESS. As mentioned earlier, the averaging window is a parameter that can be a constant or can be a function of the CHANNEL ADDRESS. In either case, the window size has to be carefully chosen in order to preserve the spectral information. The averaging window selection should be made taking into account the FWHM (measured in channels) of the spectrum obtained by a conventional spectroscopy system. The averaging window can be as wide as a few FWHM (measured in channels) or as narrow as two channels.

Selection of a narrow averaging window is not sufficient by itself. It is necessary to select the position of the averaging window. The averaging window is centered around the CHANNEL ADDRESS that is being processed. Thus, the averaging is always LOCALIZED around the currently-processed CHANNEL ADDRESS.

Initially, the entire content of the averaging memory is set to zero. When a CHANNEL ADDRESS is received, it is used to position the averaging window. Next the average numbers of all channels within the averaging window are scanned and compared with zero. If all channels within the averaging window hold zero then the CHANNEL ADDRESS is stored in the average sum of the channel pointed by CHANNEL ADDRESS. This CHANNEL ADDRESS becomes a SEED of a new average sum. Along with the seeding of the average sum, the corresponding average number increments by one.

Once the averaging memory is seeded, average sum can be built until the number of the pulse heights in the sum (average number) reaches the maximum average number of CHANNEL ADDRESS values that are required to calculate the AVERAGE CHANNEL ADDRESS. A given CHANNEL ADDRESS is added to an average sum only when the average sum is within the averaging window centered around the same CHANNEL ADDRESS. The result is a new average sum. It is possible, however, to have more than one average sum within the averaging window. In this situation there are four basic cases to calculate the average sum. The first case is simply to add together all average sums and the CHANNEL ADDRESS (ALL OF ALL). The second case is when the average sums are only on one side of the CHANNEL ADDRESS, within the averaging window. In this case, the CHANNEL ADDRESS is added to the average sum of the channel that is the closest to the CHANNEL ADDRESS (ONE OF ALL). The third and the fourth cases relate to the situation when there are average sums on both sides of the CHANNEL ADDRESS within the averaging window. In the third case the new average sum is calculated by adding the CHANNEL ADDRESS to the closest average sum regardless of on which side of the CHANNEL ADDRESS it is located (TWO OF THREE). In the fourth case, the new average sum is calculated by adding together the CHANNEL ADDRESS and the two closest average sums from each side of the CHANNEL ADDRESS (THREE OF THREE). Note that the first case when implemented automatically includes the other three cases. The third case when implemented automatically includes the second case. When the fourth case is implemented, the third case is automatically excluded. In all cases of calculating the new average sum, the corresponding average number is calculated by adding all average numbers of the average sums that are added together plus one for the CHANNEL ADDRESS.

Once the new average sum and the new average number are calculated, a new channel location for these new values is calculated by dividing the new average sum by the new average number. The new average sum and the new average number are moved to the new channel location. The old average sums and average numbers are reset to zero. By the way the new channel location is calculated it is clear that the case ALL OF ALL will always result in no more than two average sums in any averaging window. That is, it is reduced to the THREE OF THREE case. Thus, only the case TWO OF THREE and the combination of the cases TWO OF THREE and THREE OF THREE have practical application. Note, also, that the new average number is always less than twice the maximum average number because it is the result of summing one with two integer values each of which is less than the maximum average number.

When the average number in a given averaging memory channel becomes equal to or greater than the maximum average number, then the AVERAGE CHANNEL ADDRESS is calculated. The AVERAGE CHANNEL ADDRESS is calculated by dividing the average sum by the average number. After each calculation of the AVERAGE CHANNEL ADDRESS, the average number is reduced by the maximum average number, and average sum is reduced by the product of the AVERAGE CHANNEL ADDRESS and the maximum average number. The AVERAGE CHANNEL ADDRESS is sent to the SPECTRUM MEMORY UNIT to increment the SPECTRUM MEMORY.

Figure 8A:
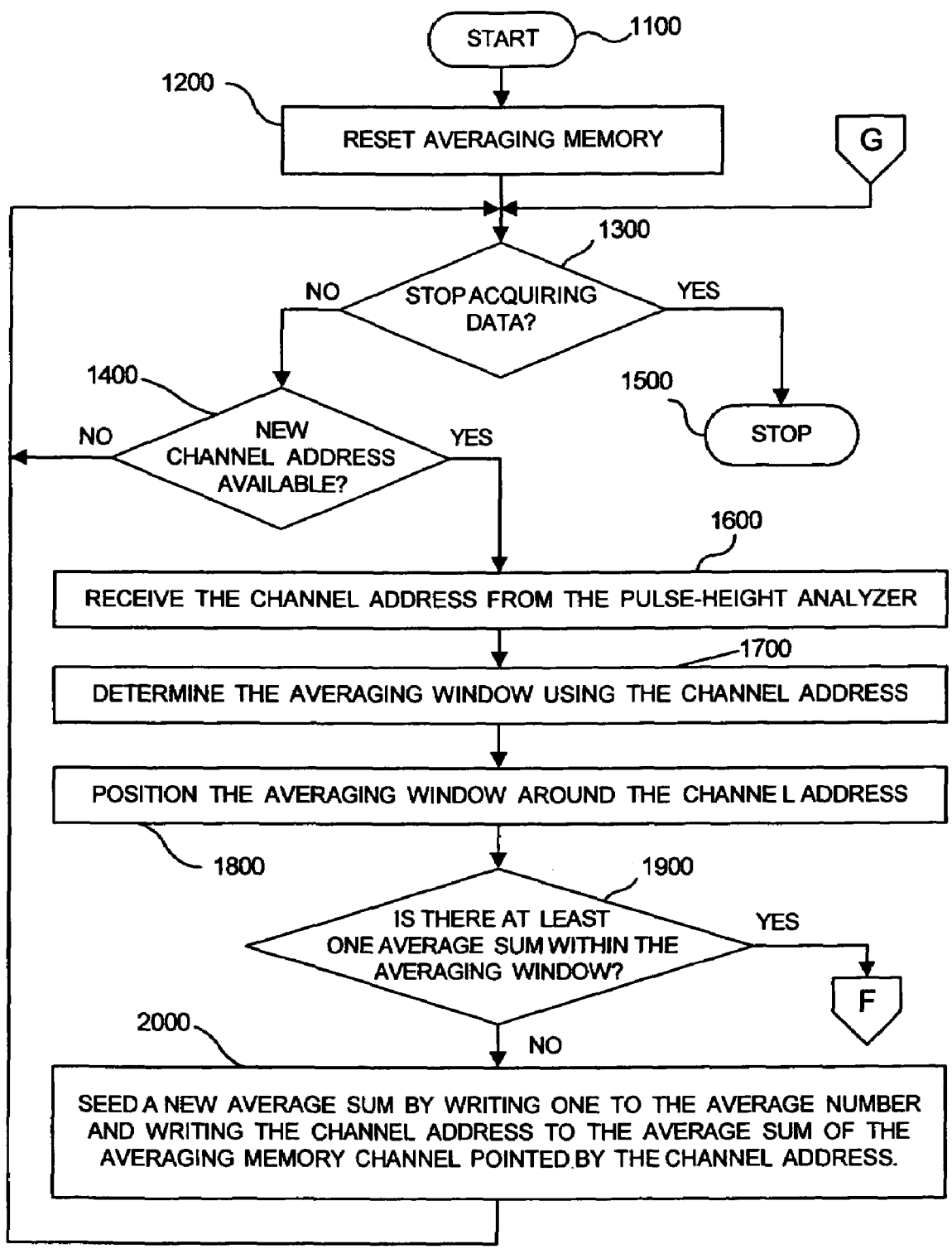
FIG. 8A is one portion of a composite flow chart (completed by FIG. 8B) illustrating the steps of the "SEEDED LOCALIZED AVERAGING" method in accordance with this invention. The "SLA UNIT" receives a CHANNEL ADDRESS from the PULSE-HEIGHT ANALYZER and generates two output values for entry in the SPECTRUM MEMORY UNIT. These output values are the AVERAGE CHANNEL ADDRESS and an "increment value"
Figure 8B:
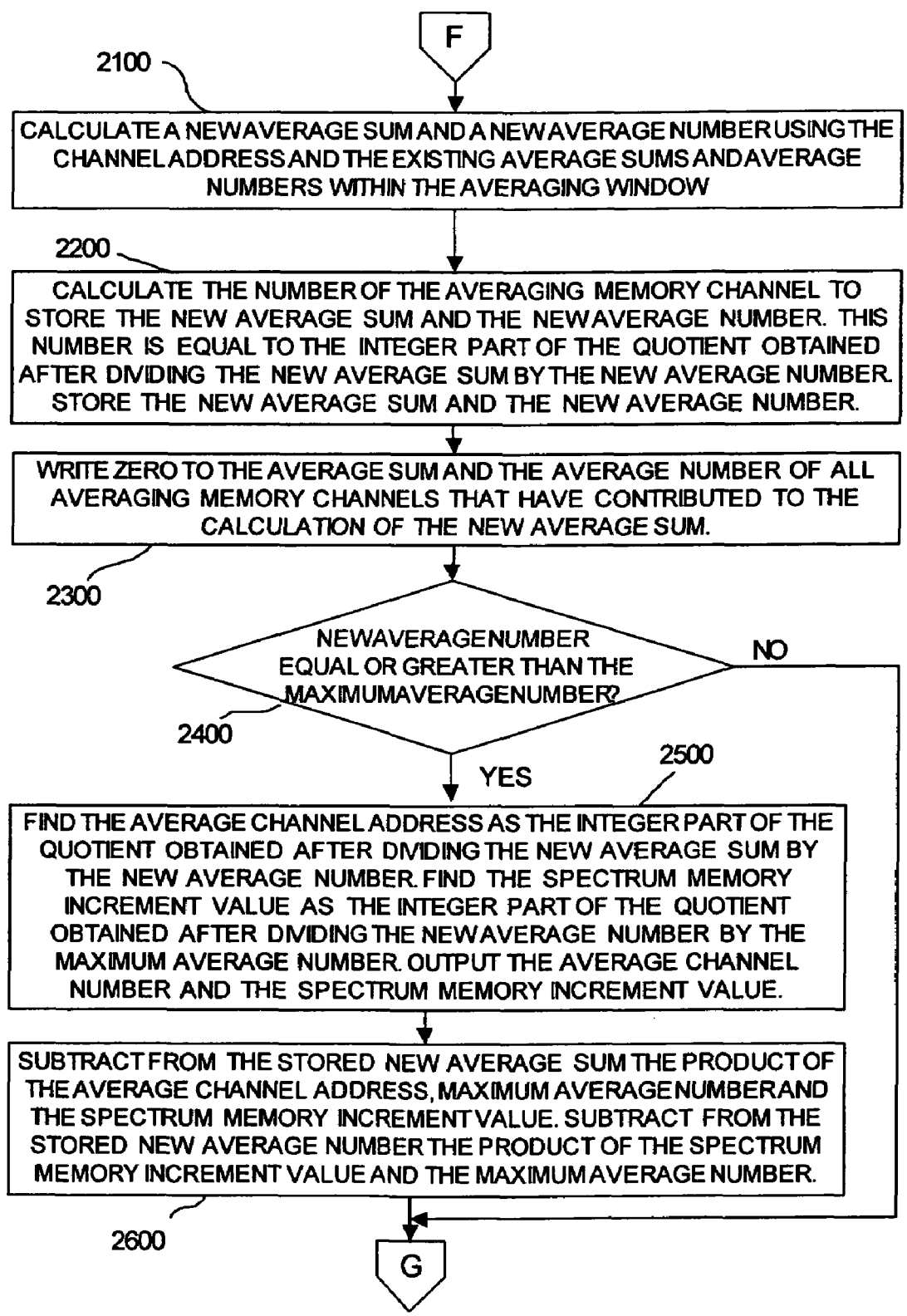
FIG. 8B is the second portion of the composite flow chart illustrating the steps of the SEEDED LOCALIZED AVERAGING method in accordance with this invention.
Figure 8C:
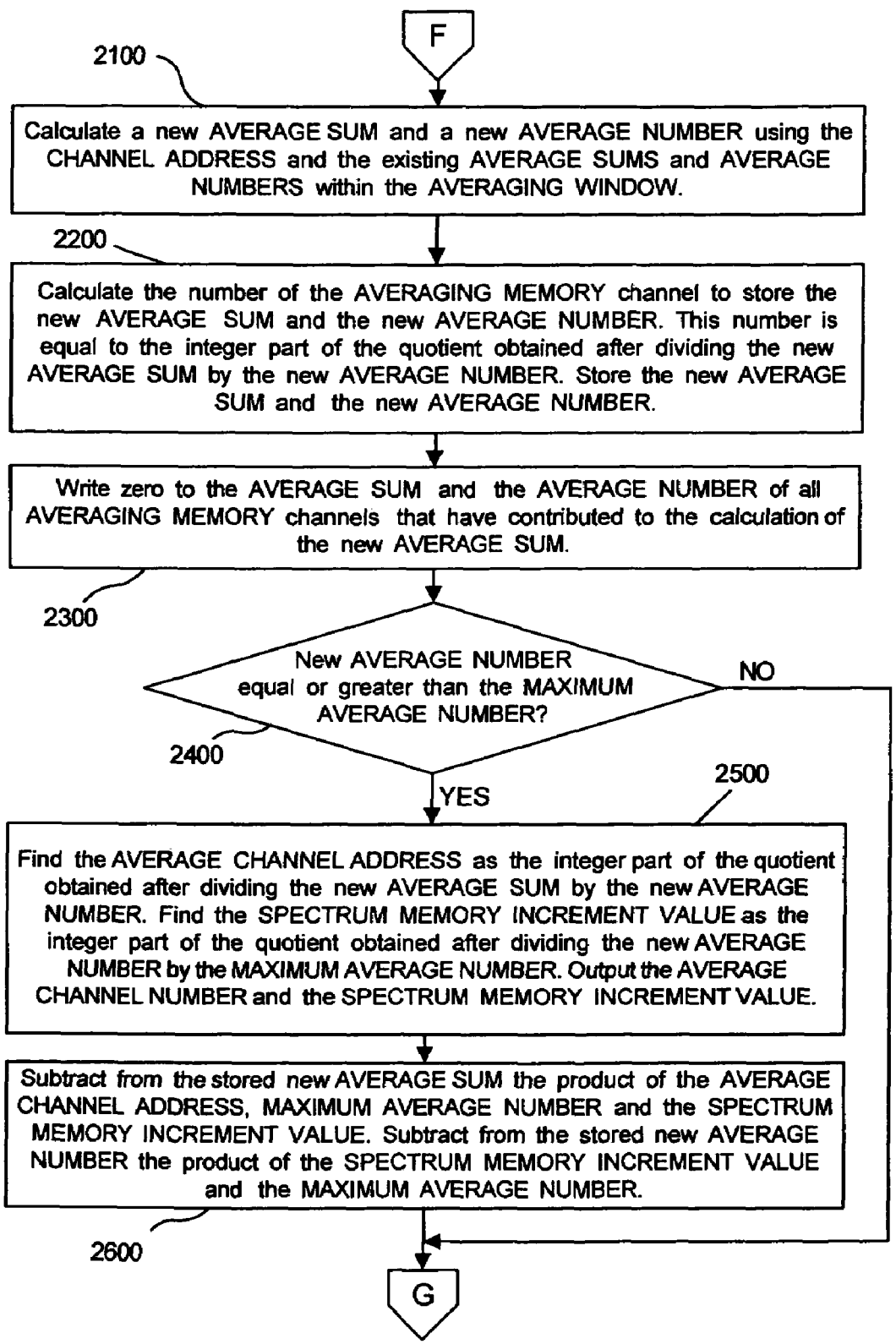
FIG. 8C, as aforementioned, employs both upper-case and lower-case lettering in the text material of the flowchart (the same material as FIG. 8B,) but makes it possible to draw attention to "defined terms" by presenting them in capital letters, while employing lower-case type in the less-critical words.

FIG. 8 shows the flowchart of the steps outlined above. The flowchart is presented on three pages in FIG. 8A, FIG. 8B, and FIG. 8C. FIG. 8B and FIG. 8C are functionally identical except the text highlights in FIG. 8C.

The flowchart in FIG. 8A uses as an input the CHANNEL ADDRESS from the PULSE-HEIGHT ANALYZER. The SLA routine generates two output values that are used by the SPECTRUM MEMORY UNIT: AVERAGE CHANNEL ADDRESS and increment value. There is one parameter: maximum average number.

The routine starts (terminator 1100) and then executes a reset of the AVERAGING MEMORY (step 1200)—write zero to all average sums and average numbers. Next the routine checks if the data acquisition is enabled (decision 1300). If the data acquisition is disabled, the routine enters stop state (terminator 1500). If the data acquisition is enabled, the presence of new CHANNEL ADDRESS from the PULSE-HEIGHT ANALYZER is checked for (decision 1400). If there is no new CHANNEL ADDRESS the routine loops back to step 1300. If a new CHANNEL ADDRESS is present, the CHANNEL ADDRESS is received by the routine (step 1500). Next step 1700 determines the averaging window using the CHANNEL ADDRESS. The averaging window is determined using one of the approaches outlined earlier—computation or look-up table. Once the averaging window is determined, it is positioned around the CHANNEL ADDRESS (step 1800). Normally, it is symmetrically centered. After the averaging window is positioned, a scan for non-zero average numbers within the window is performed to check if there is at least one average sum within the averaging window that is building up (decision 1900). If there is no average sum within the averaging window, a seeding of a new average sum is performed (step 2000). The seeding is done by writing one to the average number and writing the CHANNEL ADDRESS to the average sum of the AVERAGING MEMORY channel with channel number equal to the CHANNEL ADDRESS.

If there is at least one average sum within the averaging window, the routine calculates a new average sum and a new average number using the CHANNEL ADDRESS and the existing average sums and average numbers within the averaging window (step 2100). The averaging is done by using one of the possible ways outlined earlier.

Next step 2200 calculates the number of the AVERAGING MEMORY channel to store the new average sum and the new average number. This number is equal to the integer part of the quotient obtained after dividing the new average sum by the new average number. Store the new average sum and the new average number.

Next, the routine writes zero to the average sum and the average number of all AVERAGING MEMORY channels that have contributed to the calculation of the new average sum (step 2300). The decision 2400 checks if the new average number has become equal to or greater than the parameter maximum average number. If not, the routine loops back to decision 1300. Otherwise, the routine finds (step 2500) the AVERAGE CHANNEL ADDRESS as the integer part of the quotient obtained after dividing the new average sum by the new average number.

The routine also finds the SPECTRUM MEMORY increment value as the integer part of the quotient obtained after dividing the new average number by the maximum average number and outputs the AVERAGE CHANNEL NUMBER and the SPECTRUM MEMORY increment value. Step 2600 modifies the stored new average number and new average sum to reflect the generation of the AVERAGE CHANNEL NUMBER and the SPECTRUM MEMORY increment value This is done by subtracting from the stored new average sum the product of the three values: AVERAGE CHANNEL ADDRESS, maximum average numbers and the SPECTRUM MEMORY increment value. The routine also subtracts from the stored new average number the product of the SPECTRUM MEMORY increment value and maximum average number. After step 2600 the routine loops back to decision 1300.

Figure 9:
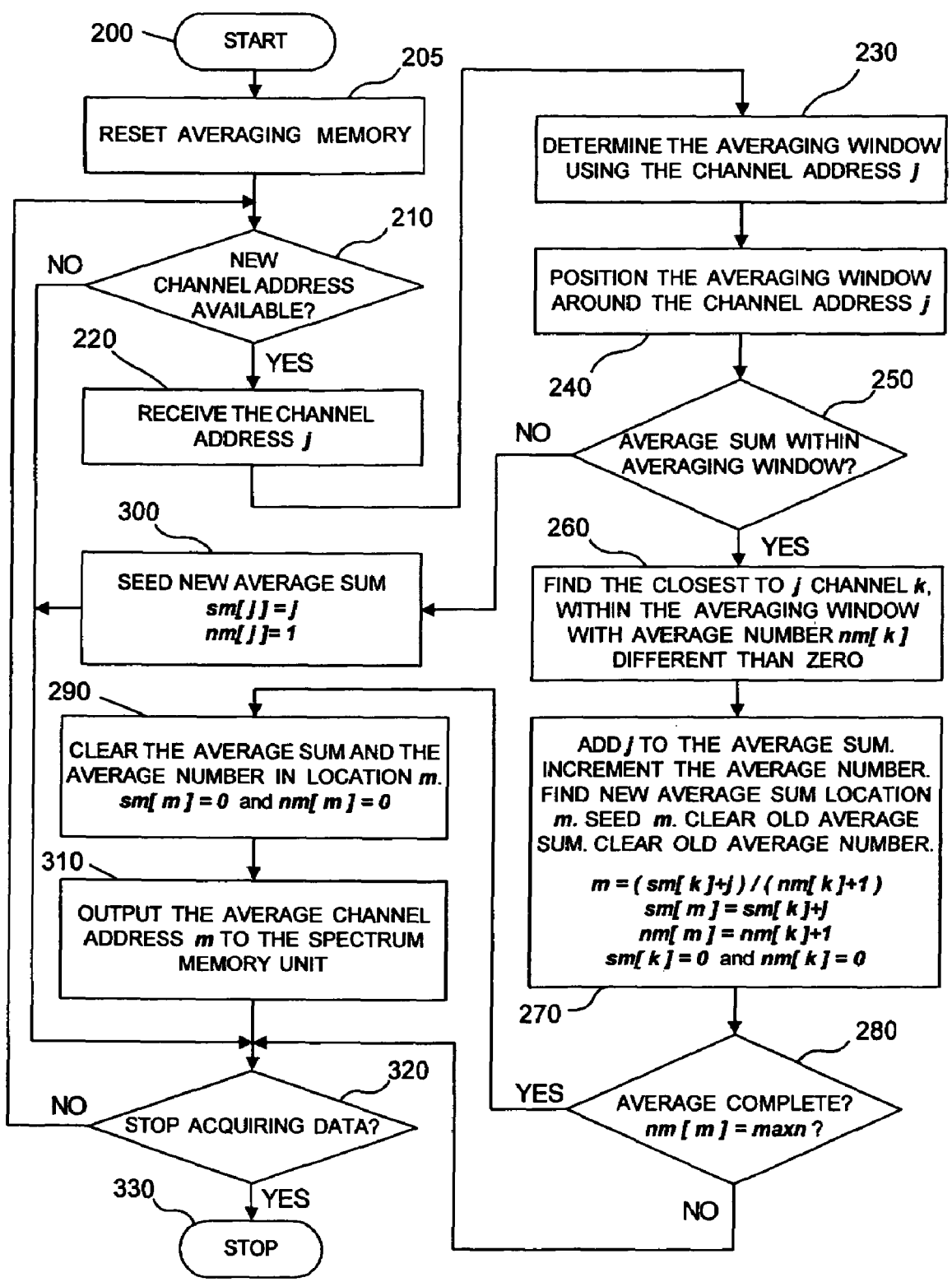
FIG. 9 is a flowchart illustrating amore-detailed implementation of the "SLA method," in which the "SPECTRUM-MEMORY increment value" is equal to one, and is considered as "hard coded" in the SPECTRUM MEMORY UNIT.

The following two flow charts FIG. 9 and FIG. 10 show more detailed implementation. In both cases, the SPECTRUM MEMORY increment value is equal to one and is considered hard coded in the SPECTRUM MEMORY UNIT as in the conventional SPECTRUM MEMORY. Therefore, the routines produce as an output only the AVERAGE CHANNEL ADDRESS.

FIG. 9 shows the flowchart of the SLA method in the case TWO OF THREE. The algorithm can be implemented either as a dedicated hardware routine or as a software program. The flowchart uses the following variables:

j=CHANNEL ADDRESS
m=new channel location of the AVERAGING MEMORY
k=channel that is closest to the CHANNEL ADDRESS on either side of the CHANNEL ADDRESS within the averaging window.
sm[j]=average sum of channel j of the AVERAGING MEMORY
nm[j]=average number of channel j of the AVERAGING MEMORY
maxn=maximum average number to calculate the AVERAGE CHANNEL ADDRESS The SLA algorithm begins execution at the start of the spectrum acquisition (step 200). After the start, a reset of the averaging memory is performed (step 205). The reset operation writes zeros to all average sums and all average numbers of the AVERAGING MEMORY. Next (decision 210) the algorithm checks for the presence of new CHANNEL ADDRESS from the PULSE-HEIGHT ANALYZER. If there is no new CHANNEL ADDRESS available, the routine checks if the data acquisition is still enabled (decision 320). If the acquisition is enabled, the routine returns to step 210. Otherwise a stop state 330 is entered. This sequence continues until a new CHANNEL ADDRESS is generated by the PULSE-HEIGHT ANALYZER and is sent to the SLA routine. When a new CHANNEL ADDRESS is detected, the CHANNEL ADDRESS j is received (step 220). The averaging window is determined as function of j (step 230). Next (step 240), the averaging window is positioned around j. After the averaging window is positioned, the AVERAGING MEMORY channels within the averaging window are scanned in order to determine if there is at least one average sum building up from previous CHANNEL ADDRESSES (decision 250). The scanning is performed by checking the average numbers within the averaging window for non-zero values. When no average sum is detected in the averaging window, the average sum in channel j is seeded with j and the average number in channel j is set to one (step 300). Then decision 320 is executed, resulting in steps as described earlier.

The decision 250 will produce a positive response (YES) when at least one average sum is present in the averaging window. The average sum channel number k that is closest to j is selected (step 260). Then (step 270), a new channel location m is calculated using j, sm[k], nm[k], and k. New average sum and new average number are calculated and stored in channel m. The average number and the average sum in the averaging memory channel k are set to zero.

Next, the average number in channel m is checked (step 280) against the maximum average number maxn. If this maximum number is reached, the average sum and the average number in channel m of the averaging memory are set to zero (step 290). The value m becomes AVERAGE CHANNEL ADDRESS, which is sent to the SPECTRUM MEMORY UNIT for incrementing the corresponding spectrum channel (step 310). Processing of new CHANNEL ADDRESSES continues as long as the spectrum acquisition is enabled (decision 320), otherwise stop state is entered (step 330).

Figure 10A:
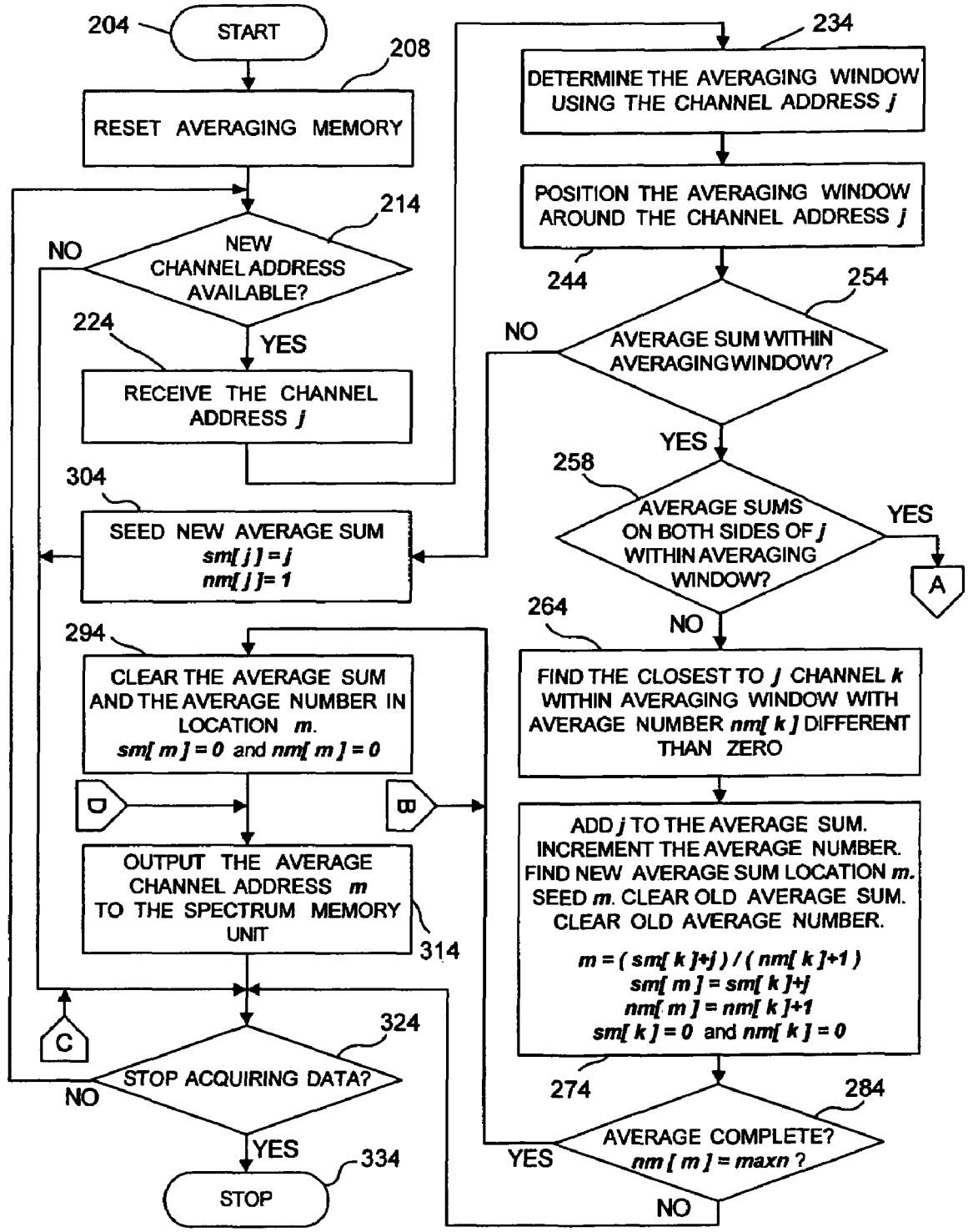
FIG. 10A is a first portion of a composite flowchart (completed by FIG. 10B) in which, once again, the "SPECTRUM-MEMORY increment value" is equal to one, and output is only the "AVERAGE CHANNEL ADDRESS;"
Figure 10B:
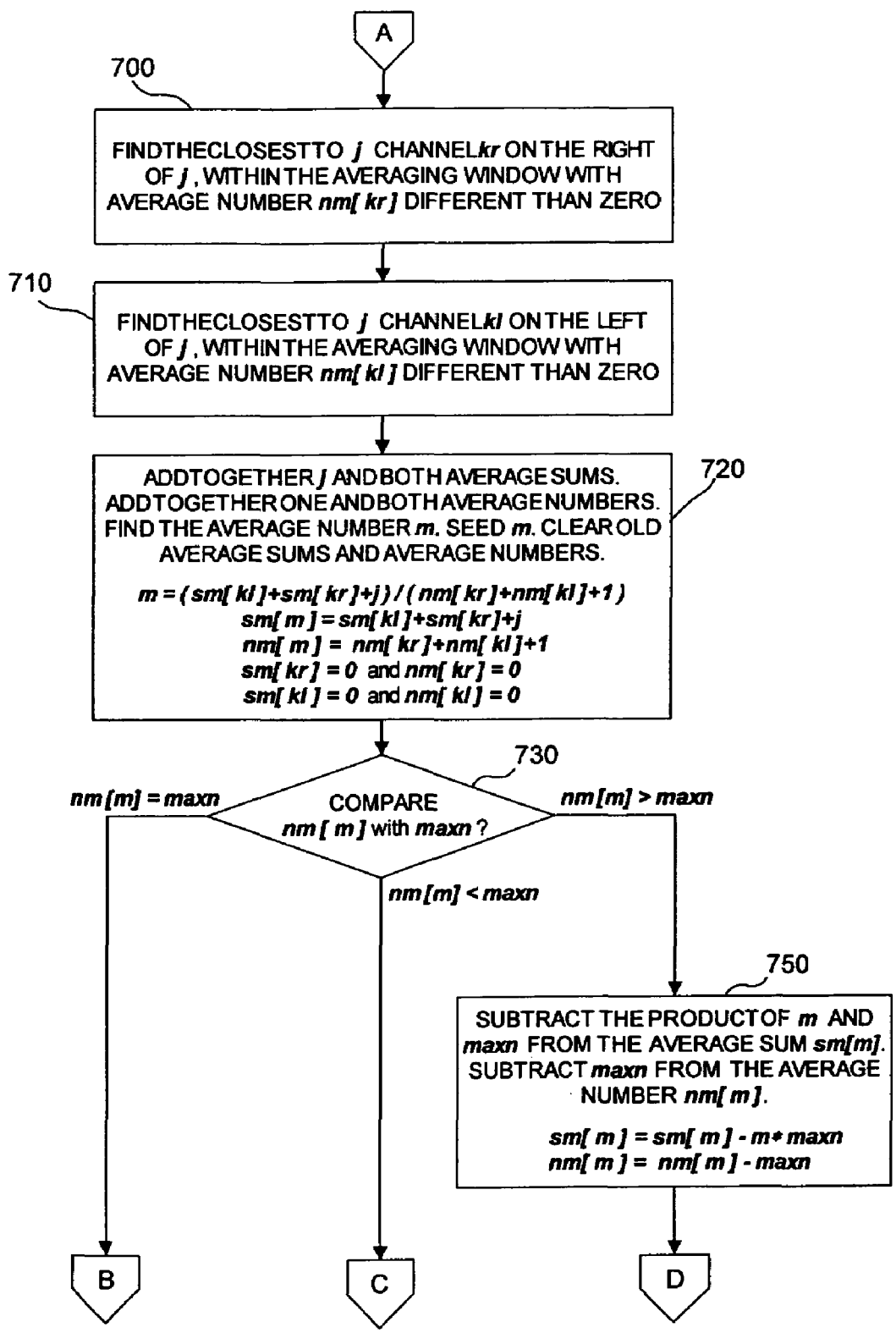
FIG. 10B is the second portion of the composite flowchart introduced in FIG. 10A.
Figure 11A:
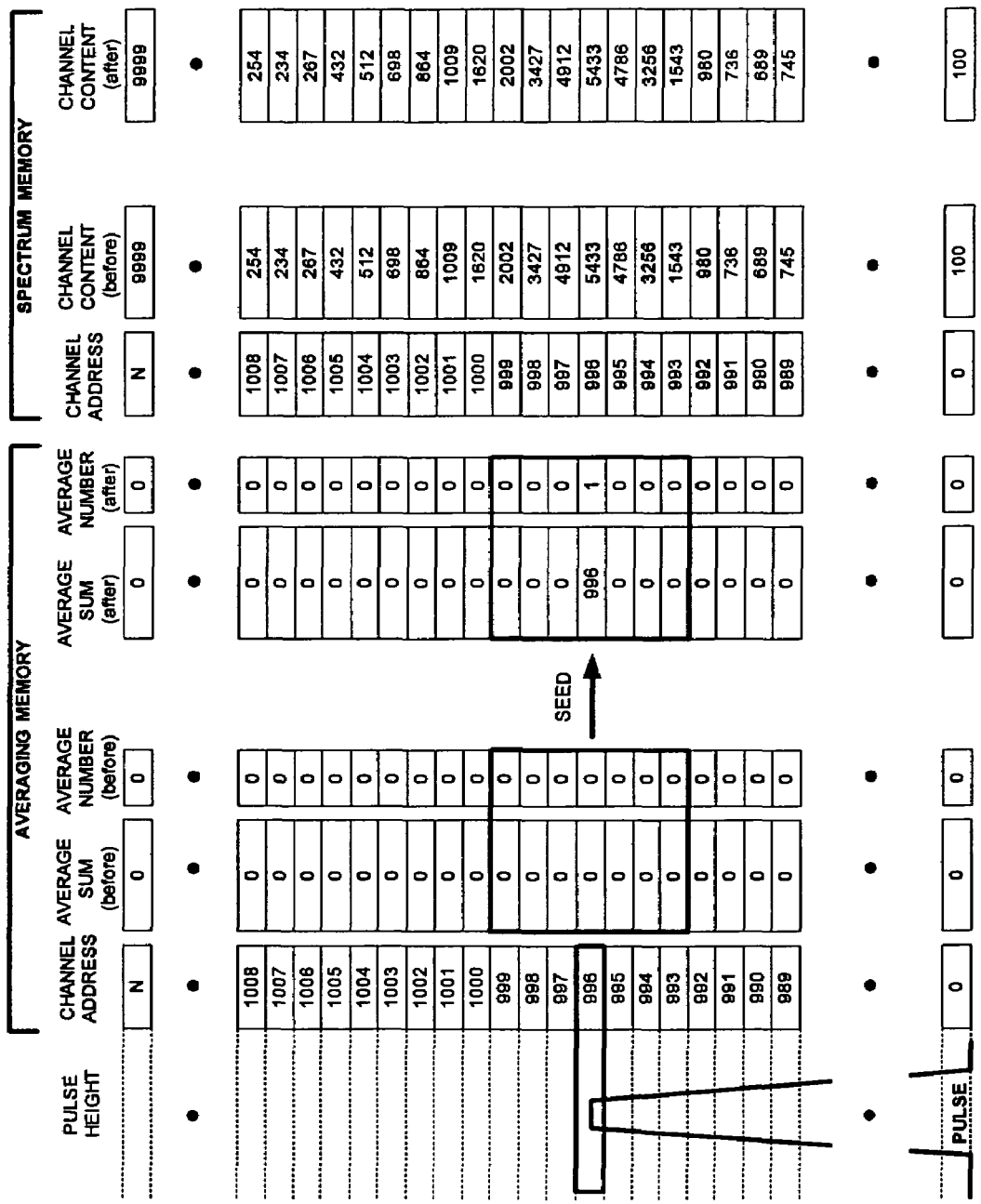
FIG. 11A illustrates the spectrum acquisition, using SLA in accordance with this invention, in which the "averaging window" is set to a fixed width of seven channels.
Figure 11B:
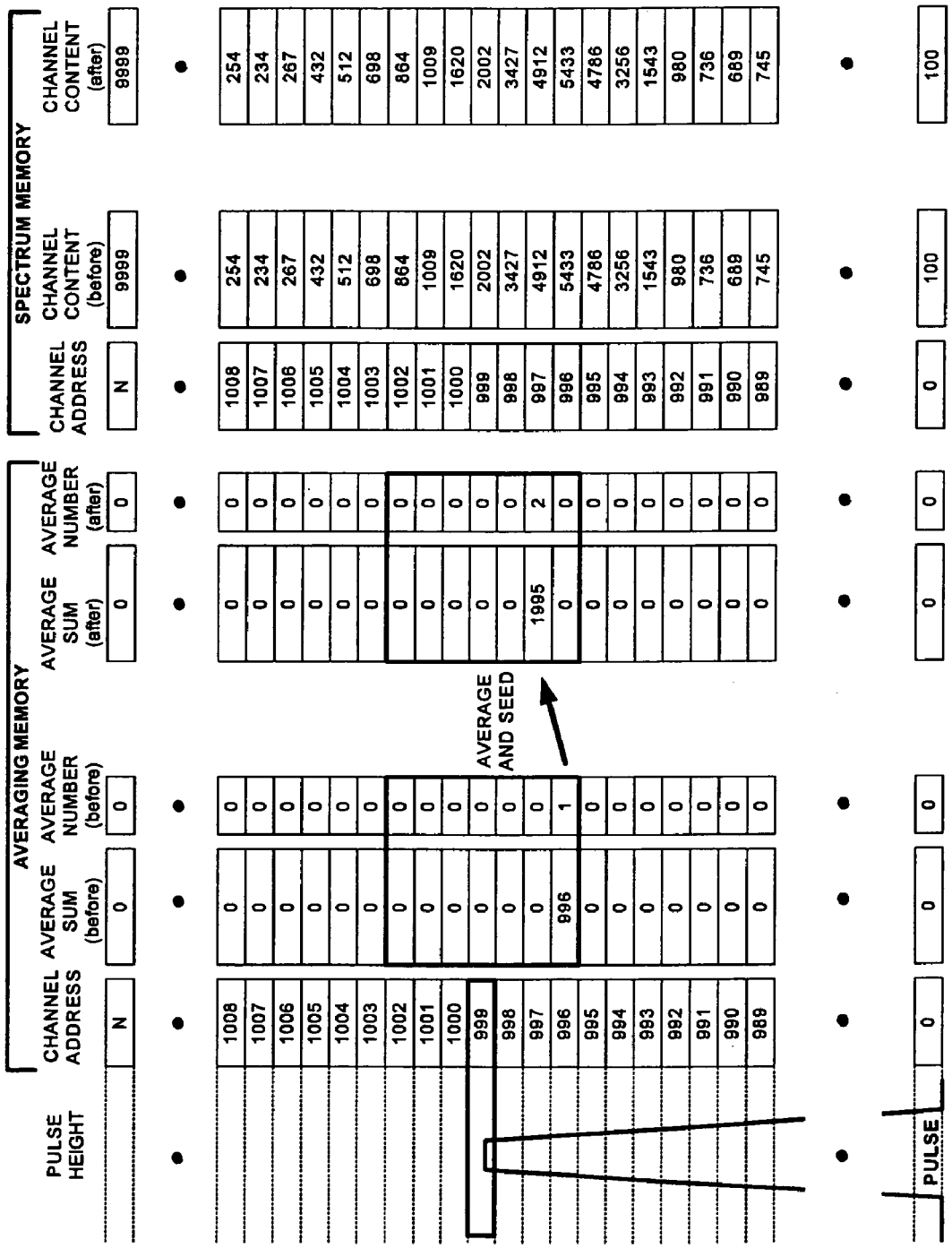
FIG. 11B illustrates a spectrum acquisition, again using SLA in accordance with the invention, in which the averaging window is again set to a fixed width of seven channels and in which both an "average sum" and an "average number" are built.
Figure 11C:
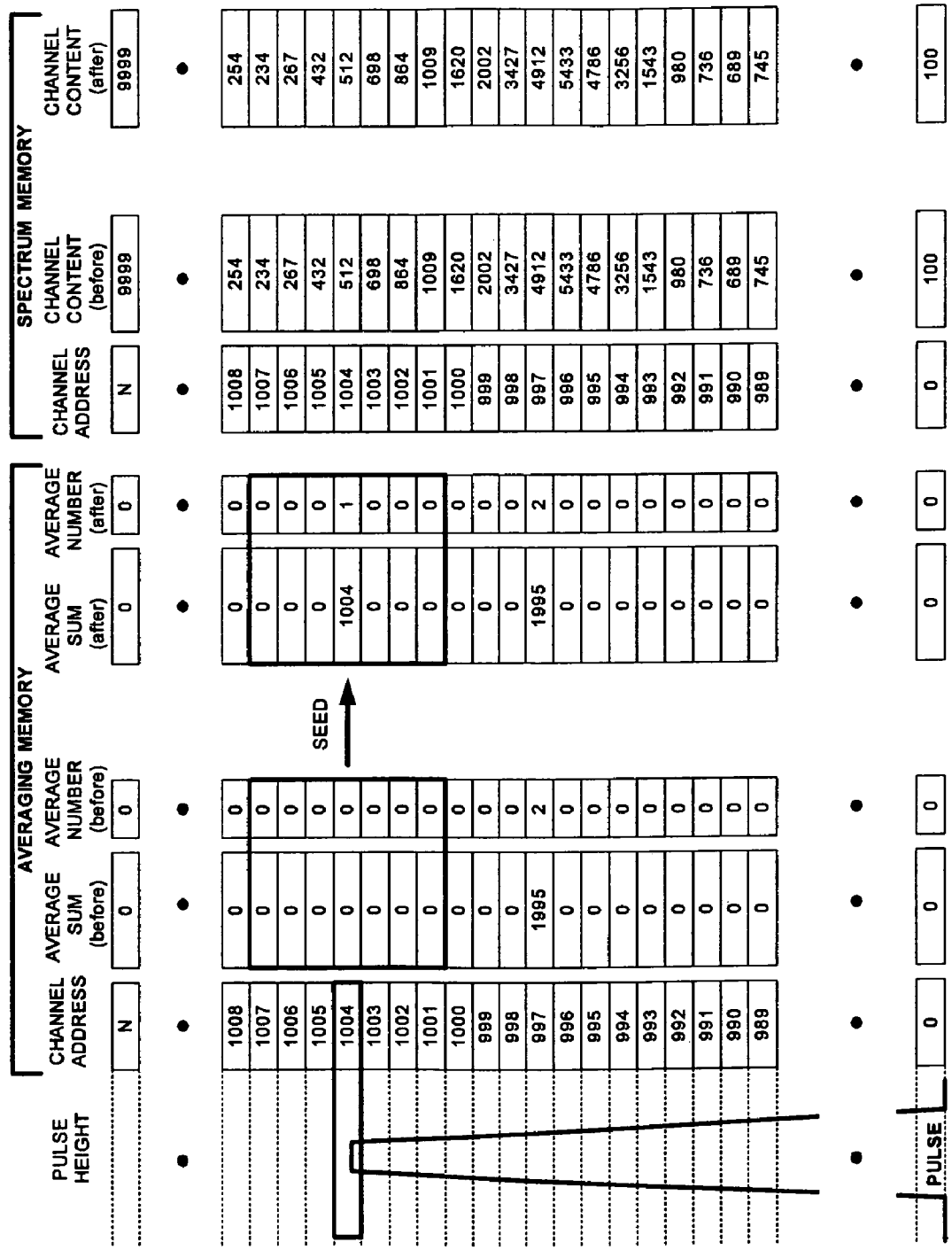
FIG. 11C, like FIG. 11A, illustrates a "seeding operation" in which there is no "average sum" within the averaging window but the pulse height falls within a higher-numbered channel address.
Figure 11D:
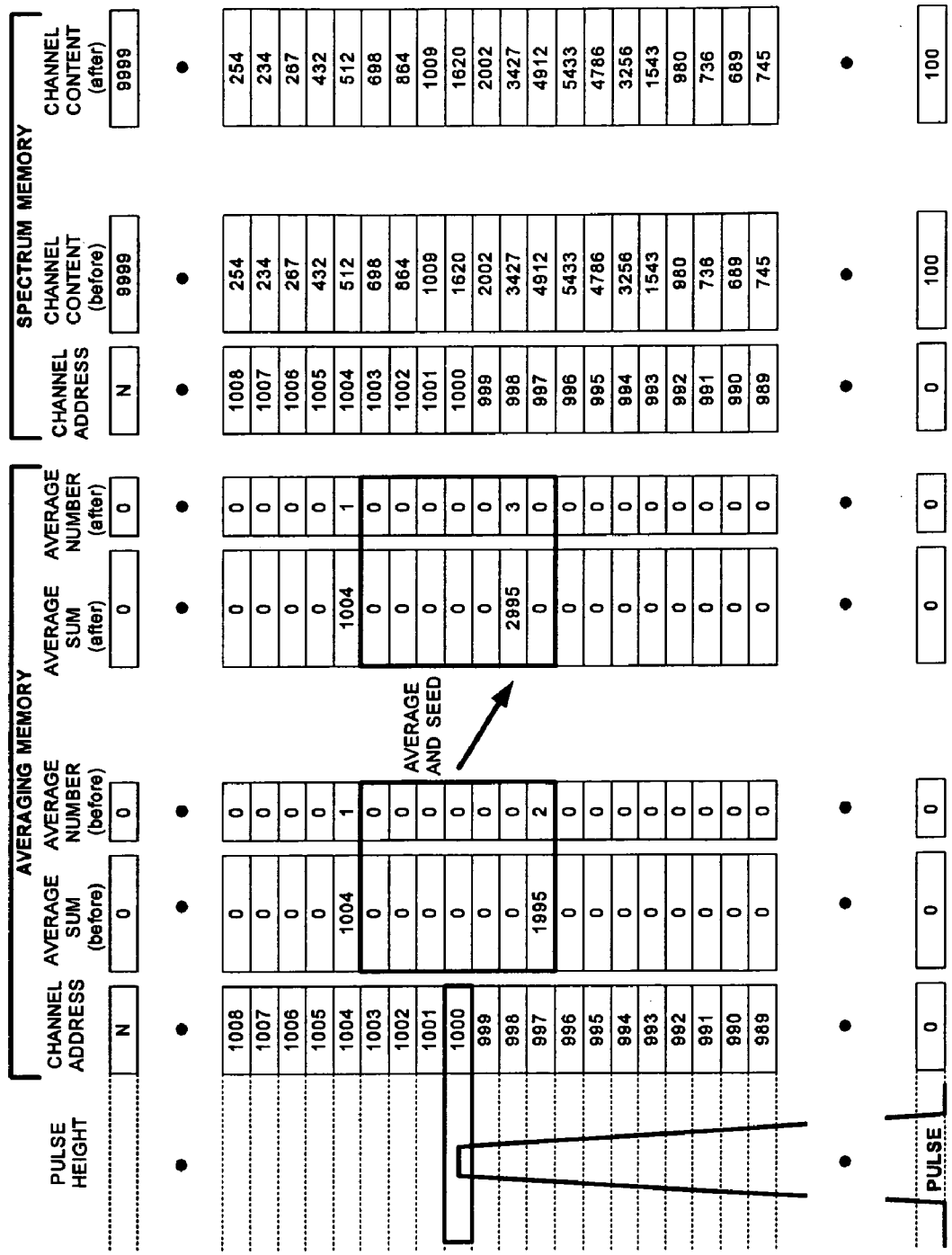
FIG. 11D illustrates the building of both the "average sum" and "average number," in which the maximum number of averaging values, "maximum average number," is set to four.
Figure 11E:
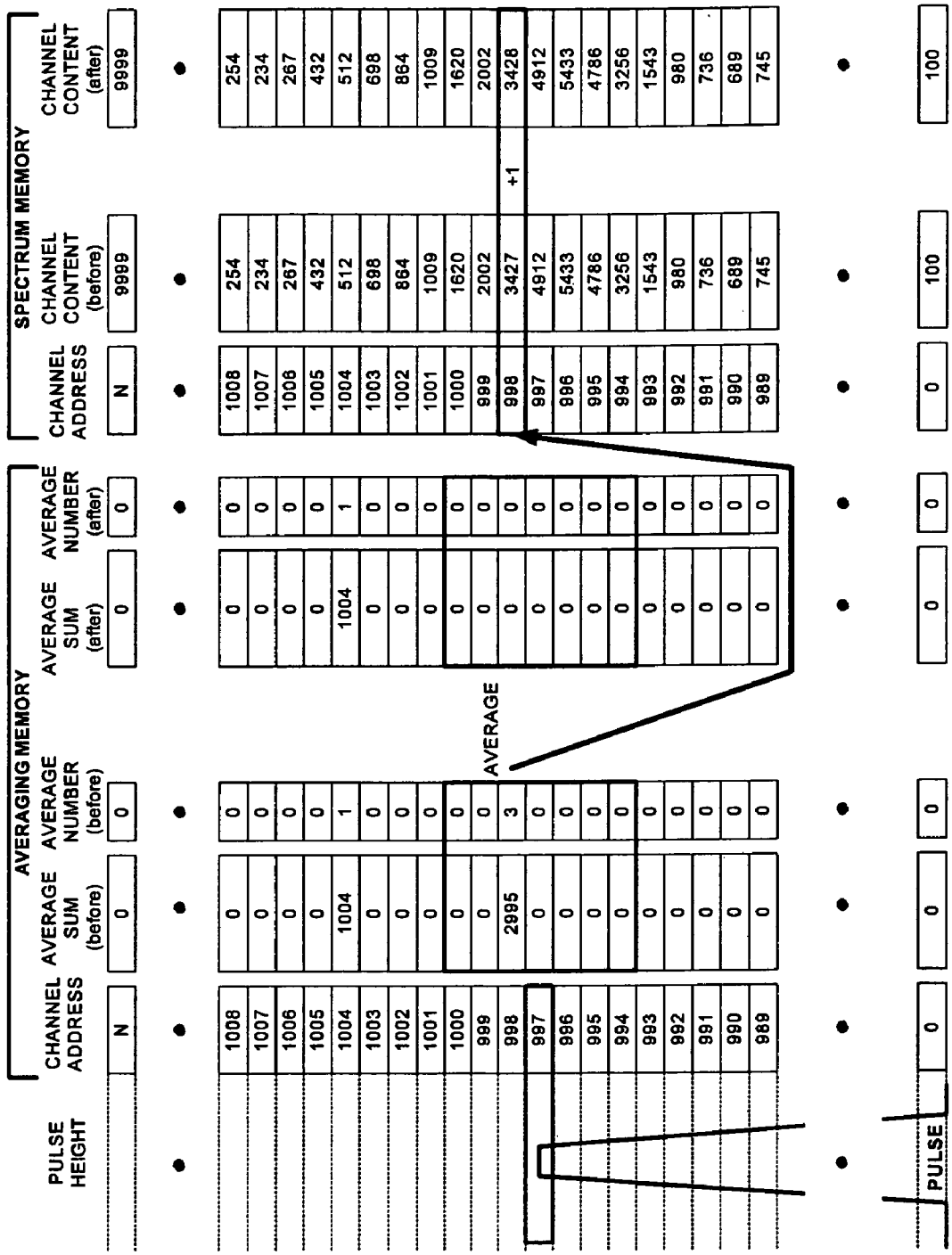
FIG. 11E illustrates the function of "SPECTRUM MEMORY" as a concluding step in the SLA method.

FIG. 10 shows the flowchart of the SLA method that combines the TWO OF THREE and THREE OF THREE cases. This algorithm can also be implemented either as a dedicated hardware routine or as a software program. The flowchart uses the following variables:

j=CHANNEL ADDRESS
m=new channel location of the AVERAGING MEMORY k=channel that is closest to the CHANNEL ADDRESS on either side of the CHANNEL ADDRESS within the averaging window.

kr=channel that is closest to the CHANNEL ADDRESS on the right side of the CHANNEL ADDRESS within the averaging window.

kl=channel that is closest to the CHANNEL ADDRESS on the left side of the CHANNEL ADDRESS within the averaging window.

sm[j]=average sum of channel j of the AVERAGING MEMORY nm[j]=average number of channel j of the AVERAGING MEMORY maxn=maximum average number to calculate the AVERAGE CHANNEL ADDRESS The flow chart in FIG. 10A has similar arrangement as the flowchart in FIG. 9. The section in FIG. 10B implements the THREE OF THREE averaging. Steps 204, 208, 214, 224, 234, 244, 254, 264, 274, 284, 294, 304, 314, 324, and 334 are identical to their respective counterparts in FIG. 9—steps 200, 205, 210, 220, 230, 240, 250, 260, 270, 280, 290, 300, 310, 320, and 330. The main difference is the decision 258 that follows decision 254. At this decision point, the routine checks if there are average sums on both sides of the CHANNEL ADDRESS within the averaging window. If this is not true, the routine continues as in the flowchart of FIG. 9. Otherwise the routine branches to the THREE OF THREE algorithm shown in FIG. 10B.

Step 700 finds channel kr that is closest to the CHANNEL ADDRESS on the right. Similarly, step 710 finds channel kl that is closest to the CHANNEL ADDRESS on the left. After the left and right average sums and average numbers are found, the new average sum and the new average number are calculated (step 720). Step 720 also calculates the new channel location of the new average sum and the new average number. Next, the new average number is compared with the maximum average number (decision 730). If the new average number is less than the maximum average number, the routine returns to decision 324. If the new average number is equal to the maximum average number, the routine returns to decision 294. If the new average number is greater than the maximum average number, the step 750 is executed. In this step, the stored new average sum is reduced by the product of the new average sum and the maximum average number. The stored new average number is reduced by the maximum average number. The routine returns to step 314.

FIG. 11 illustrates the spectrum acquisition using SLA. The averaging window is set to a fixed width of seven channels—three from each side and including the channel corresponding to CHANNEL ADDRESS. FIG. 11A and FIG. 11C show a seeding operation, when there is no average sum within the averaging window. FIG. 11B, FIG. 11D, and FIG. 11E illustrate the building of the average sum and the average number. The maximum number of averaging values, maximum average number, in this example is set to four, This maximum number is reached in FIG. 11E, which also illustrates the process of incrementing the SPECTRUM-MEMORY channel.

Figure 12:
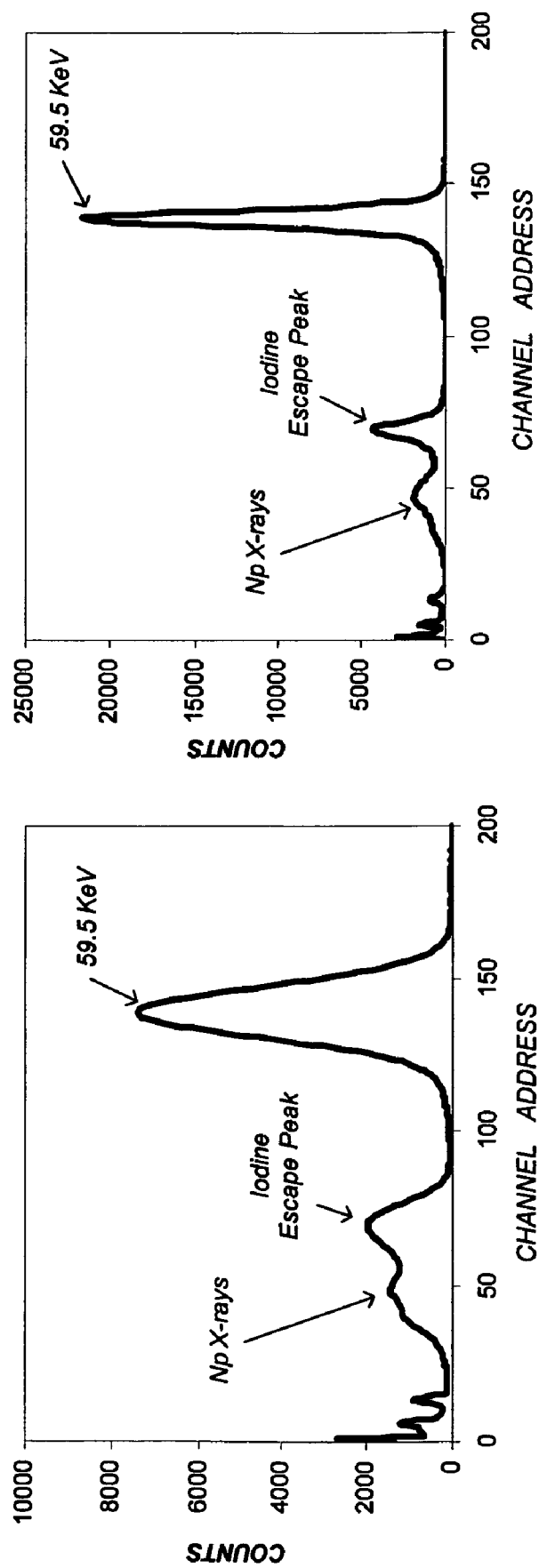
FIG. 12 presents examples comparing the spectra obtained with scintillation radiation detector from Am-241 radioactive source without using SLA (on the left) and with SLA (on the right.) The improved resolution when using SLA, as evidenced by the sharpness of the peak, is clear.
Figure 13:
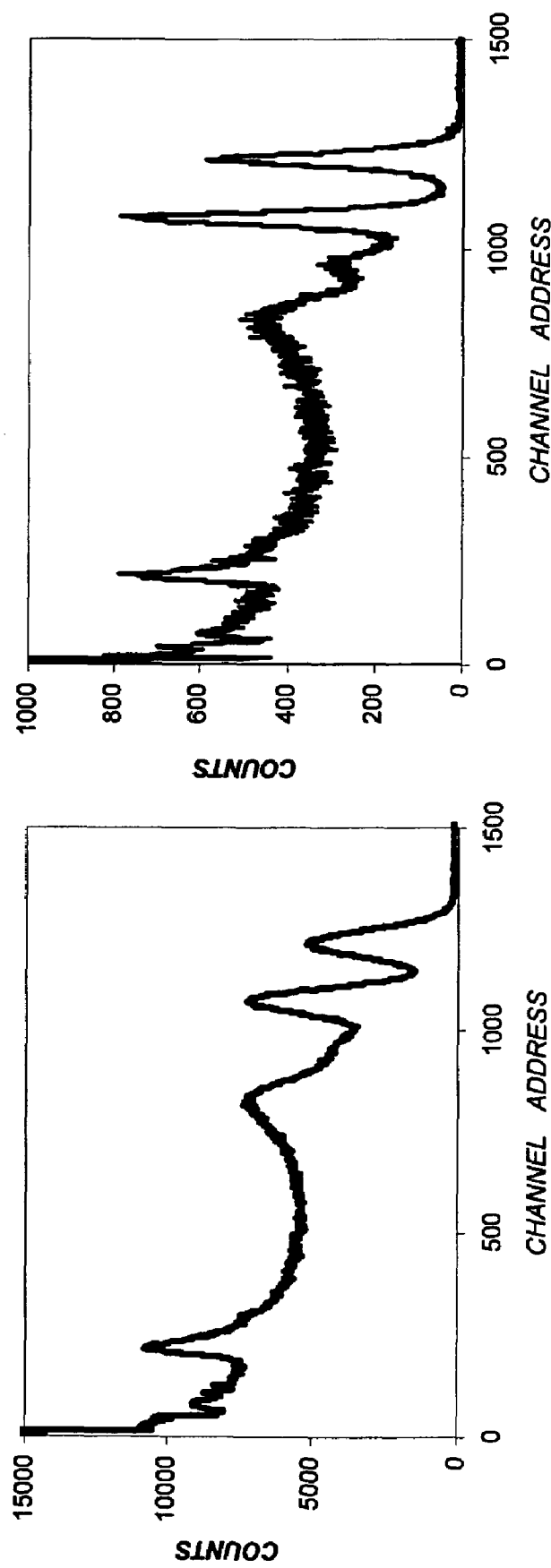
FIG. 13 shows examples of two more spectra, obtained with scintillation radiation detector from Co-60 source of radiation, in which the spectrum on the left was, again, made without using SLA, while the spectrum on the right was made with the use of SLA. Once again, the contrast in resolution is very apparent.

FIG. 12 and FIG. 13 depict examples of spectra obtained with a conventional spectroscopy system and with a spectroscopy system using SLA. FIG. 12 and FIG. 13 show the evident improvement of the FWHM when the SLA technique is used.

One feature of the above method is the reduced number counts in the channels compared to the conventional method. The total number of the counts in the SLA spectra is maxn times less compared to a conventional spectrum taken under the same conditions, where maxn is the number of CHANNEL ADDRESSES used to obtain a single AVERAGE CHANNEL ADDRESS—the maximum average number. The SLA method can record the same number of pulses as the conventional method if each CHANNEL ADDRESS is reused maxn−1 times. Each time the CHANNEL ADDRESS is reused it will be added to a different set of CHANNEL ADDRESSES to obtain the AVERAGE CHANNEL ADDRESS. This is achieved by shifting the CHANNEL ADDRESS in time and scrambling with CHANNEL ADDRESS from the PULSE HEIGHT ANALYZER and other time-shifted CHANNEL ADDRESSES.

Figure 14:
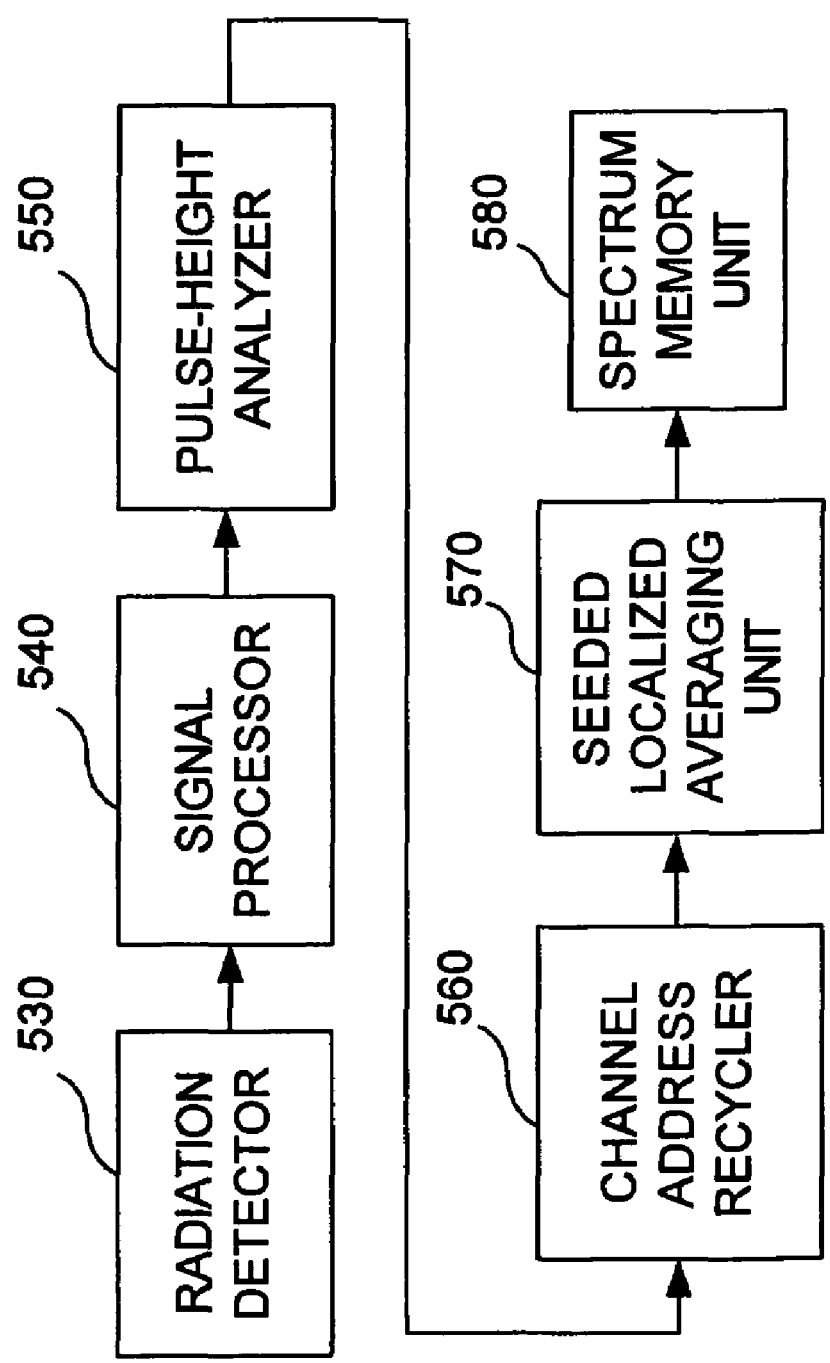
FIG. 14 is a block diagram of the spectroscopy system using CHANNEL ADDRESS "recycling," as explained in the detailed specification.

FIG. 14 shows the block diagram of the spectroscopy system using CHANNEL-ADDRESS recycling. The configuration is similar to the SLA spectroscopy system arrangement. The RADIATION DETECTOR (530), the SIGNAL PROCESSOR (540), the PULSE-HEIGHT ANALYZER (550). the SEEDED LOCALIZED AVERAGING UNIT (570), and the SPECTRUM MEMORY UNIT (580) are similar and have the same functions as in the SLA spectroscopy system. The CHANNEL ADDRESS RECYCLER (560) is a new block that performs the CHANNEL-ADDRESS-reuse functions.

Figure 15:
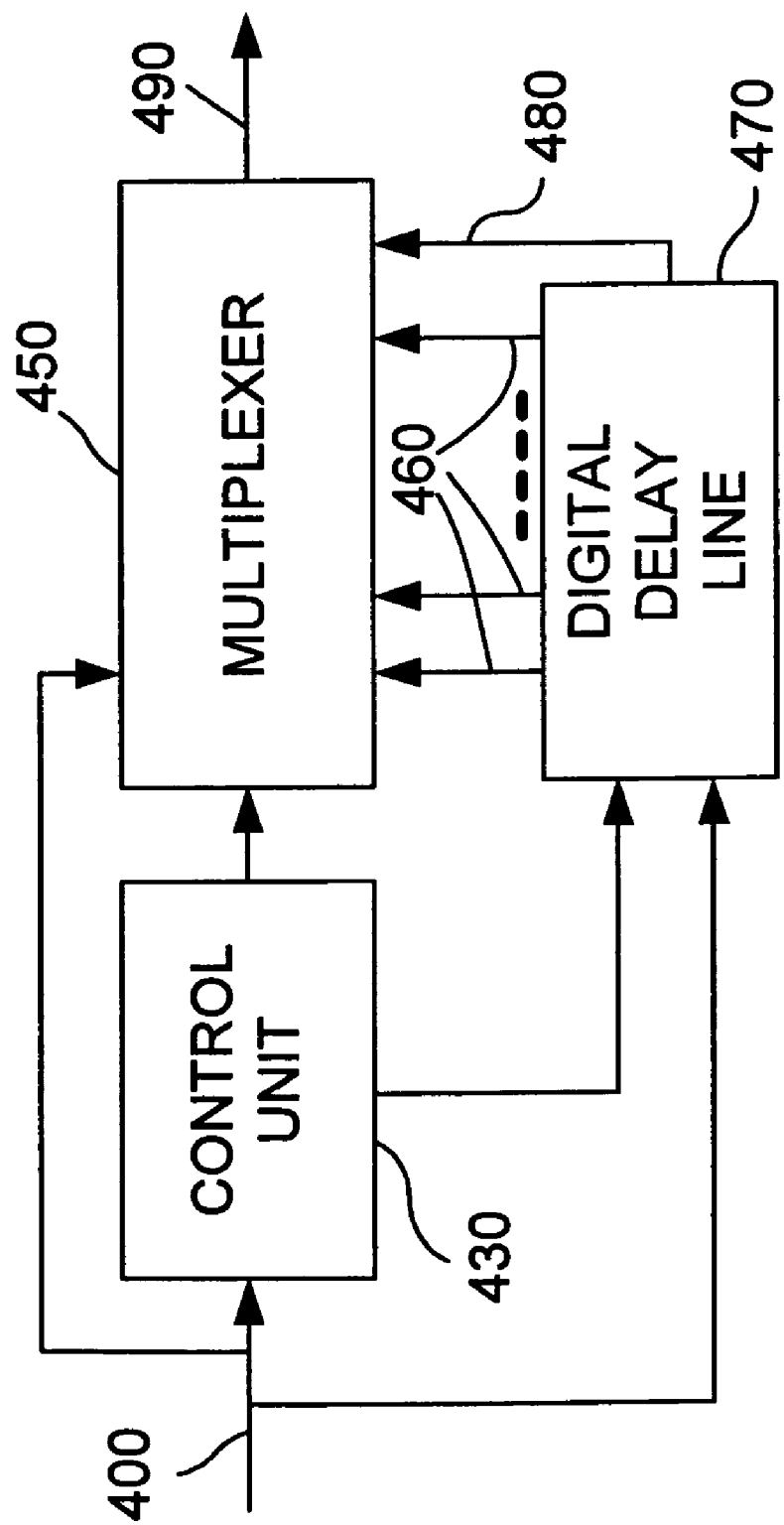
FIG. 15 is a block diagram of the "CHANNEL ADDRESS RECYCLER," including a DIGITAL DELAY LINE 470, as explained in the specification.

FIG. 15 shows the block diagram of the CHANNEL ADDRESS RECYCLER. The CHANNEL ADDRESS from the PULSE-HEIGHT ANALYZER is received at the input (400). The CHANNEL ADDRESS is applied to a CONTROL UNIT (430), DIGITAL DELAY LINE (470) and MULTIPLEXER (450). The CONTROL UNIT synchronizes the work of all units.

The purpose of the DIGITAL DELAY LINE is to store and shift the CHANNEL ADDRESS from the input (400). The delay line has multiple taps (460) and an output (480) that comprise the output nodes of the DIGITAL DELAY LINE. The output nodes are spaced in a way to provide adequate scrambling of the CHANNEL ADDRESSES. The number of the output nodes is equal to maxn−1. The MULTIPLEXER provides means to select the data from either the input (400) or one output node at a time. The selected data can be passed to the output (490). The DIGITAL DELAY LINE output node data could represent a CHANNEL ADDRESS or can be empty. Only the CHANNEL ADDRESS data are passed to the output (490).

Figure 16:
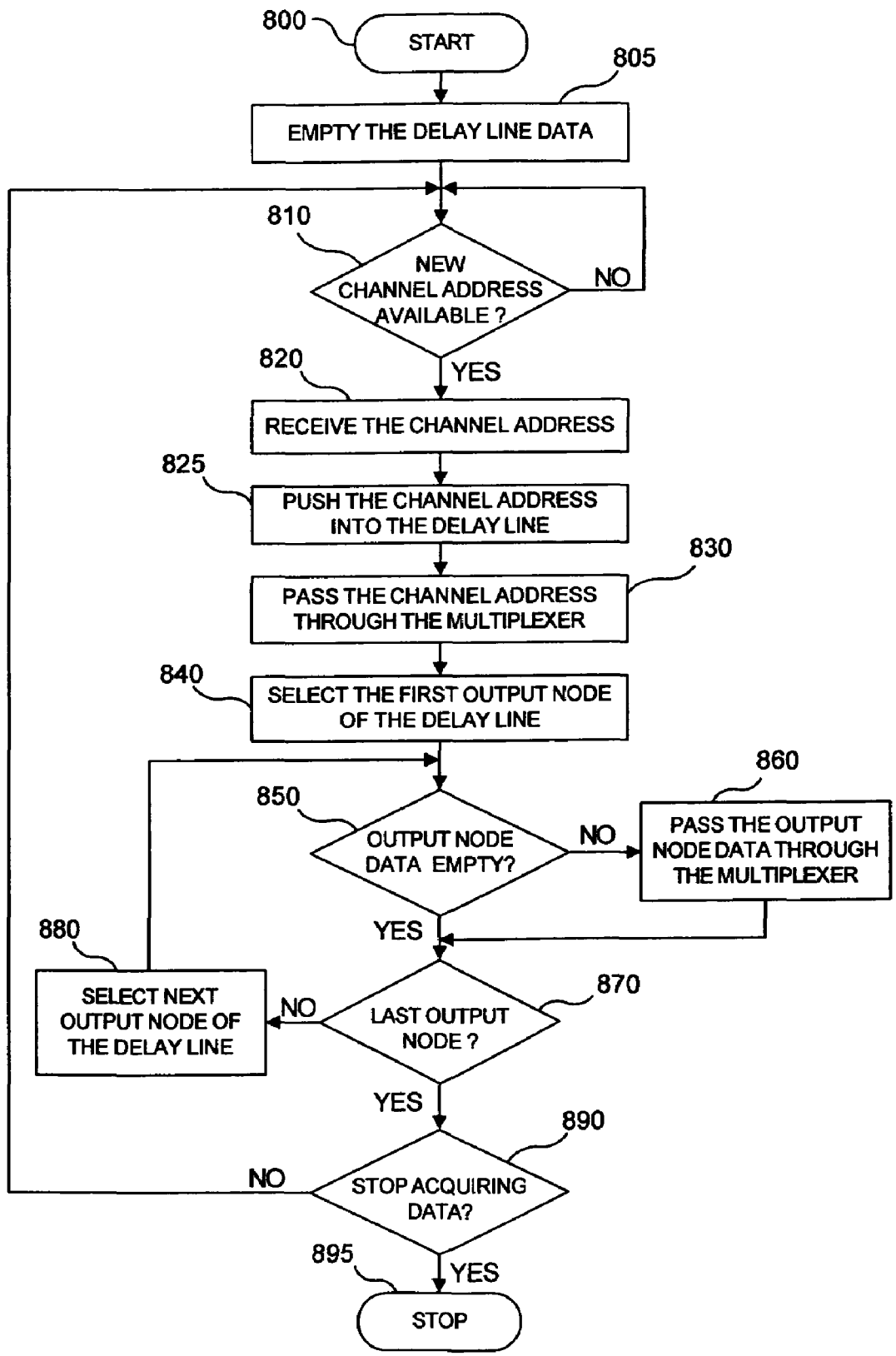
FIG. 16 is a flowchart showing the algorithm of the CHANNEL ADDRESS RECYCLER.

FIG. 16 shows the algorithm of the CHANNEL ADDRESS RECYCLER. After operation starts (step 800), the DIGITAL DELAY LINE is set to empty state (step 805). The empty state is set by setting an empty flag associated with each location of the DIGITAL-DELAY-LINE. The empty flags will all clear after a number of CHANNEL ADDRESSES equal to the length of the DIGITAL-DELAY-LINE is received. The input is constantly monitored for new CHANNEL ADDRESS (decision 810). If new CHANNEL ADDRESS is available, it is received (step 820). Next, the CHANNEL ADDRESS is pushed into the DIGITAL-DELAY-LINE (step 825). The CHANNEL ADDRESS is passed to the output through the MULTIPLEXER (step 830), which also selects the first output node of the delay line (step 840). Next, a loop (steps 850, 860, 870, 880) is executed that passes to the output the output-node data that represent CHANNEL ADDRESSES. If the acquisition is not stopped (decision 890), the operation is repeated for each new CHANNEL ADDRESS, otherwise the stop state (895) is entered.

From the operational flowchart it is clear that for every CHANNEL ADDRESS at the input of the CHANNEL ADDRESS RECYCLER maxn CHANNEL ADDRESS values will be generated at the CHANNEL ADDRESS RECYCLER output under the condition that the DIGITAL DELAY LINE is completely filled out. Thus, the effect of reduced counts due to the SLA method can be compensated for.

Although a full disclosure and discussion of the various aspects of the method, apparatus, and operation thereof in accordance with my invention have been presented in the foregoing paragraphs, it is possible that certain variations thereof can be made in the future without departing from the scope of my invention. Accordingly, the scope of my invention is defined in the following claims, which cover the elements of my invention and equivalents thereof.

I claim:

1. A method for generating average channel address and spectrum-memory increment value from electrical pulses received from a radiation detector, said electrical pulses having already been resolved by a pulse-height analyzer into channel addresses indicative of their respective heights, said method comprising the steps of:
- (a) receiving a first channel address from said pulse-height analyzer;
- (b) using said first channel address to determine an averaging window;
- (c) positioning said averaging window around said first channel address;
- (d) if there is no average sum in the averaging memory within said averaging window, then seeding a new average sum in the averaging-memory channel pointed by said first channel address;
- (e) if there is at least one average sum in the averaging memory within said averaging window, then:
  - (1) calculating a new average sum using said first channel address and the existing average sum or sums within said averaging window; and
  - (2) calculating a new average number using existing average numbers within said averaging window;
- (f) calculating a new address of said averaging-memory channel to store said new average sum and said new average number as the integer part of the quotient obtained by dividing said new average sum by said new average number;
- (g) writing zero to the average sum and average number of all averaging-memory channels that have contributed to the calculation of said new average sum;
- (h) if said new average number is equal to or greater than a predetermined maximum average number, then:
  - (1) dividing said new average sum by said new average number to obtain a quotient;
  - (2) generating and outputting the average channel address as being equal to the integer part of said quotient;
  - (3) generating and outputting the spectrum-memory increment value as being equal to quotient obtained by dividing said new average number by said predetermined maximum average number;
  - (4) subtracting from said new average sum the product of said average channel address, said predetermined maximum average number, and said spectrum-memory increment value;
  - (5) subtracting from said new average number the product of said predetermined maximum average number and said spectrum-memory increment value; and
- (i) repeating steps (a) through (h) until a first channel address is no longer received from said pulse-height analyzer.

2. A method in accordance with claim 1 for seeding new average sum and new average number by writing the value of said first channel address as new average sum and one as new average number at the channel of said averaging memory pointed by said first channel address.

3. A method for generating average channel address and spectrum-memory increment value in accordance with claim 1, including the additional step of resetting said averaging memory before receiving said first channel address from said pulse-height analyzer.

4. A method in accordance with claim 1 in which average sums and average numbers are stored in channels in said averaging memory and said channels are pointed by channel addresses received from said pulse-height analyzer.

5. A method in accordance with claim 1 for calculating a new average sum by adding together said first channel address and all existing average sums within said averaging window.

6. A method in accordance with claim 1 for calculating a new average number by adding together the digit one and all existing average numbers within said averaging window.

7. A method in accordance with claim 1 for calculating a new average sum by adding together said first channel address and the average sum within said averaging window pointed by the channel address closest to said first channel address.

8. A method in accordance with claim 1 for calculating a new average number by adding together the digit one and the average number within said averaging window pointed by the channel address closest to said first channel address.

* * * * *